US009849046B2

(12) United States Patent
Misonou et al.

(10) Patent No.: US 9,849,046 B2
(45) Date of Patent: Dec. 26, 2017

(54) OCCUPANT TRANSFER APPARATUS FOR VEHICLE

(71) Applicant: HONDA ACCESS CORP., Niiza-shi, Saitama (JP)

(72) Inventors: Yoshimasa Misonou, Niiza (JP); Shintaro Arimura, Niiza (JP)

(73) Assignee: HONDA ACCESS CORP., Niiza-shi (JP)

( * ) Notice: Subject to any disclaimer, the term of this patent is extended or adjusted under 35 U.S.C. 154(b) by 0 days.

(21) Appl. No.: 13/894,079

(22) Filed: May 14, 2013

(65) Prior Publication Data

US 2014/0086715 A1 Mar. 27, 2014

(30) Foreign Application Priority Data

Sep. 21, 2012 (JP) .................................. 2012-208270
Oct. 15, 2012 (JP) .................................. 2012-227772

(51) Int. Cl.
*A61G 3/06* (2006.01)
*B60N 2/24* (2006.01)

(52) U.S. Cl.
CPC ............. *A61G 3/062* (2013.01); *B60N 2/245* (2013.01)

(58) Field of Classification Search
CPC .......... B60P 1/02; B60P 1/5433; B66C 23/36; A61G 3/06; A61G 3/062; A61G 7/10; A61G 7/1013; B60N 2/245; Y10S 414/134

(Continued)

(56) References Cited

U.S. PATENT DOCUMENTS 943,498 A * 12/1909 Weller .................... B66B 17/34
187/357
4,155,587 A * 5/1979 Mitchell ................ B60N 2/245
296/65.12

(Continued)

FOREIGN PATENT DOCUMENTS

DE      27 30 305 B2    1/1978
DE      3701463 A1    7/1988

(Continued)

OTHER PUBLICATIONS

Notice of Allowance dated Dec. 11, 2013, issued in corresponding Japanese application No. 2012-208270.

(Continued)

*Primary Examiner* — Anna Momper
*Assistant Examiner* — Mark Hageman
(74) *Attorney, Agent, or Firm* — Westerman, Hattori, Daniels & Adrian, LLP

(57) ABSTRACT

An occupant transfer apparatus includes: guide rails arranged substantially along an up-down direction between a seat and a door; a slide unit raisable and lowerable along the guide rails; and a transfer board foldably supported by the slide unit. A long elastic member connects a floor panel and the slide unit, and elastic force of the elastic member biases the slide unit upward. By balancing the elastic force of the elastic member with the weight of an assisted person, the assisted person sitting on the transfer board can be raised and lowered with very small force. Moreover, because there is no need for a special drive source, the structure can be realized at low cost, and also be made compact. This prevents the structure from narrowing a vehicle-compartment space and obstructing an able-bodied person getting in and out of a vehicle.

5 Claims, 21 Drawing Sheets

(58) Field of Classification Search
USPC ......... 414/495, 541, 543, 921, 550; 187/901
See application file for complete search history.

(56) References Cited

U.S. PATENT DOCUMENTS

| | | | | |
|---|---|---|---|---|
| 5,018,933 | A | * | 5/1991 | Kramer .......................... 414/542 |
| 5,308,214 | A | * | 5/1994 | Crain et al. .................... 414/541 |
| 5,672,041 | A | * | 9/1997 | Ringdahl et al. .............. 414/545 |
| 5,746,465 | A | * | 5/1998 | Jones et al. ................. 296/65.03 |
| 6,035,462 | A | * | 3/2000 | Bennett ................ A61G 7/1007 4/254 |
| 6,067,674 | A | * | 5/2000 | Moser .................. A47K 17/026 4/254 |
| 6,449,783 | B1 | * | 9/2002 | Moser .................... A47K 13/10 4/254 |
| 6,582,181 | B2 | * | 6/2003 | Suehiro et al. ............... 414/812 |
| 7,207,765 | B1 | * | 4/2007 | Egan ............................. 414/541 |
| 7,249,656 | B2 | * | 7/2007 | Huber ...................... B66B 5/28 187/343 |
| 9,351,898 | B2 | * | 5/2016 | Triolo ....................... A61G 5/14 |
| 2009/0121531 | A1 | * | 5/2009 | Appelqvist et al. ....... 297/300.4 |

FOREIGN PATENT DOCUMENTS

| | | |
|---|---|---|
| DE | 41 14 252 A1 | 11/1992 |
| JP | 54-006234 A | 1/1979 |
| JP | 58-029528 U | 2/1983 |
| JP | 63-32040 U | 3/1988 |
| JP | 53-48638 U | 4/1988 |
| JP | 7-31456 U | 6/1995 |
| JP | 2001-294065 A | 10/2001 |
| JP | 2003-127731 A | 5/2003 |
| JP | 2003-341988 A | 12/2003 |
| JP | 2004-359159 A | 12/2004 |
| JP | 2006-122567 A | 5/2006 |
| JP | 2009-82568 A | 4/2009 |
| JP | 2009-082568 A | 4/2009 |
| JP | 2009-160303 A | 7/2009 |
| JP | 2009-225965 A | 10/2009 |
| JP | 2009225965 A * | 10/2009 |
| JP | 2010-259598 A | 11/2010 |

OTHER PUBLICATIONS

Office Action dated Dec. 11, 2013, issued in corresponding Japanese application No. 2012-227772.
German Office Action dated Mar. 6, 2014, issued in corresponding German Patent Application No. 10 2013 211 948.8, w/English translation, (10 pages).
Office Action dated Dec. 10, 2015, issued in counterpart Japanese Patent Application No. 2012-225030 (4 pages).

* cited by examiner

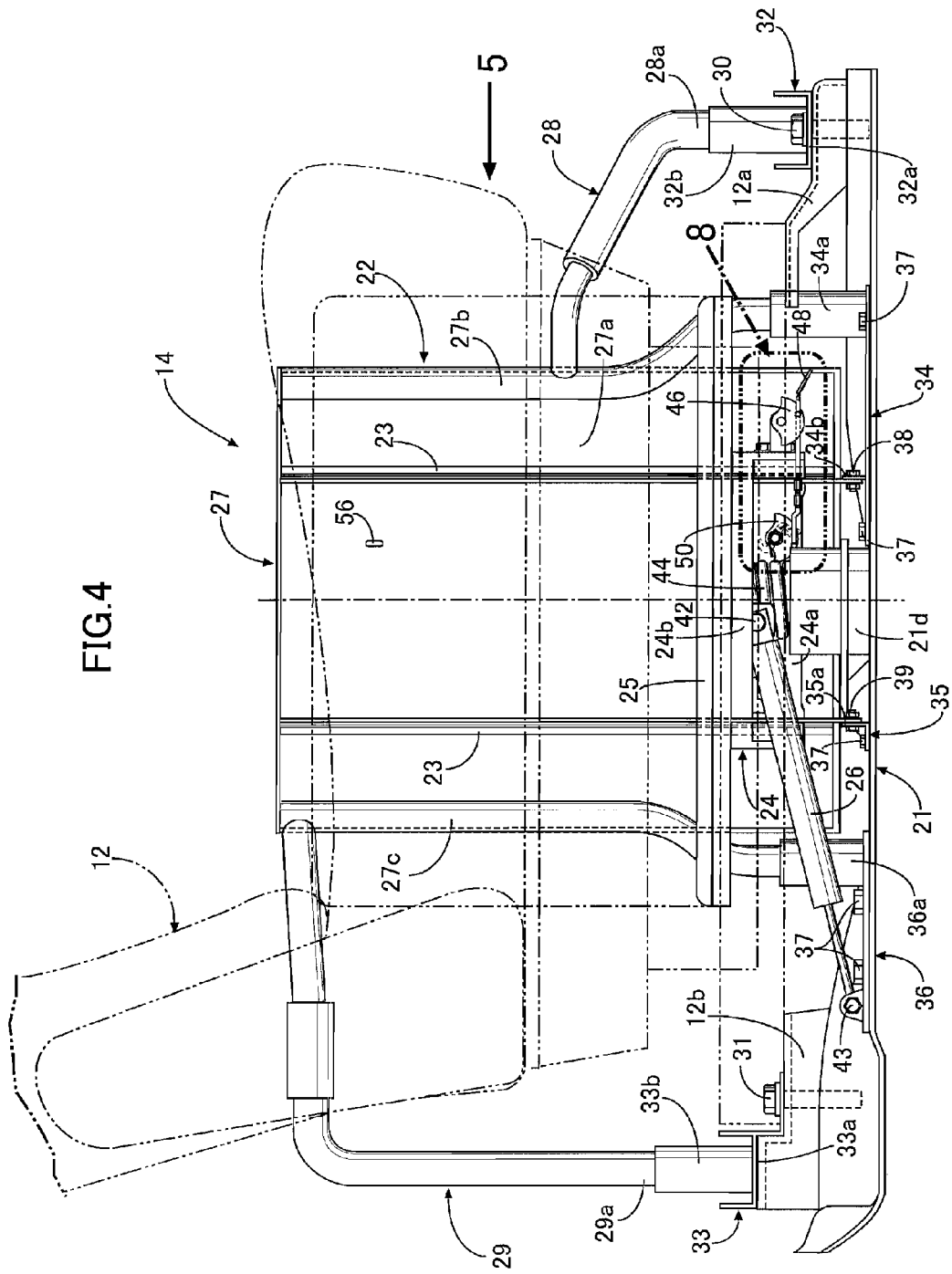

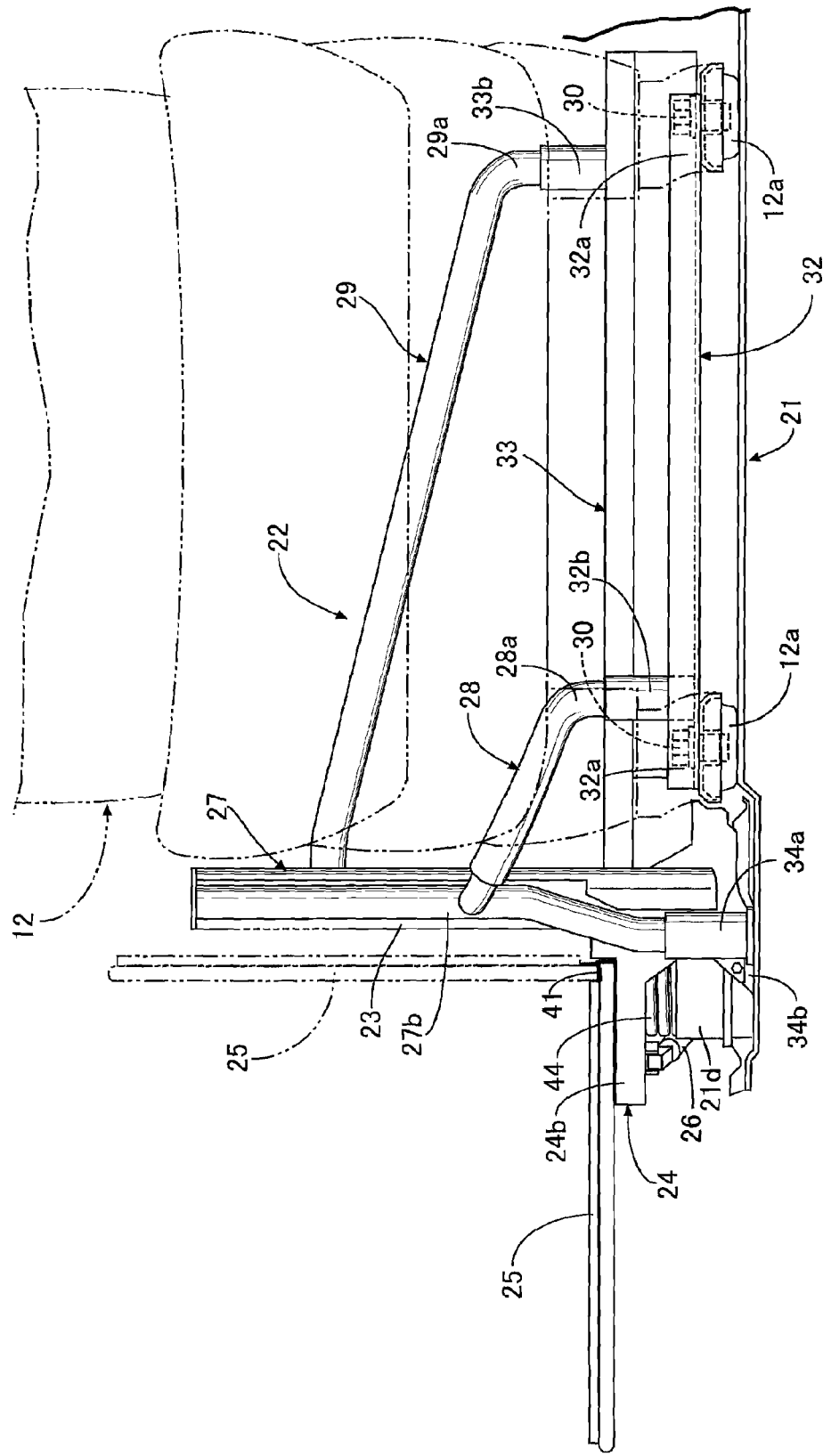

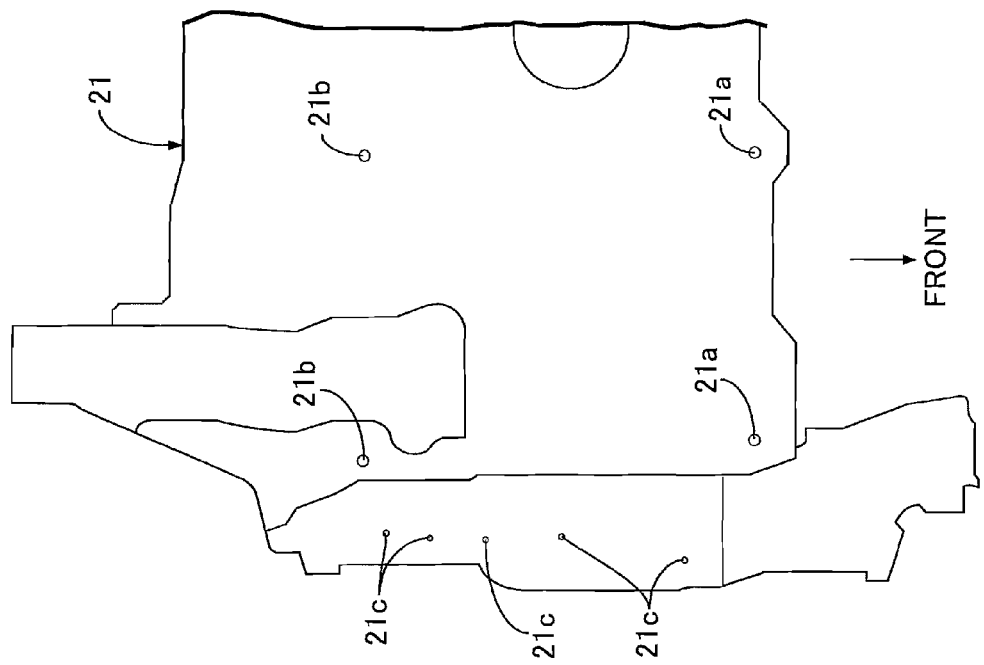
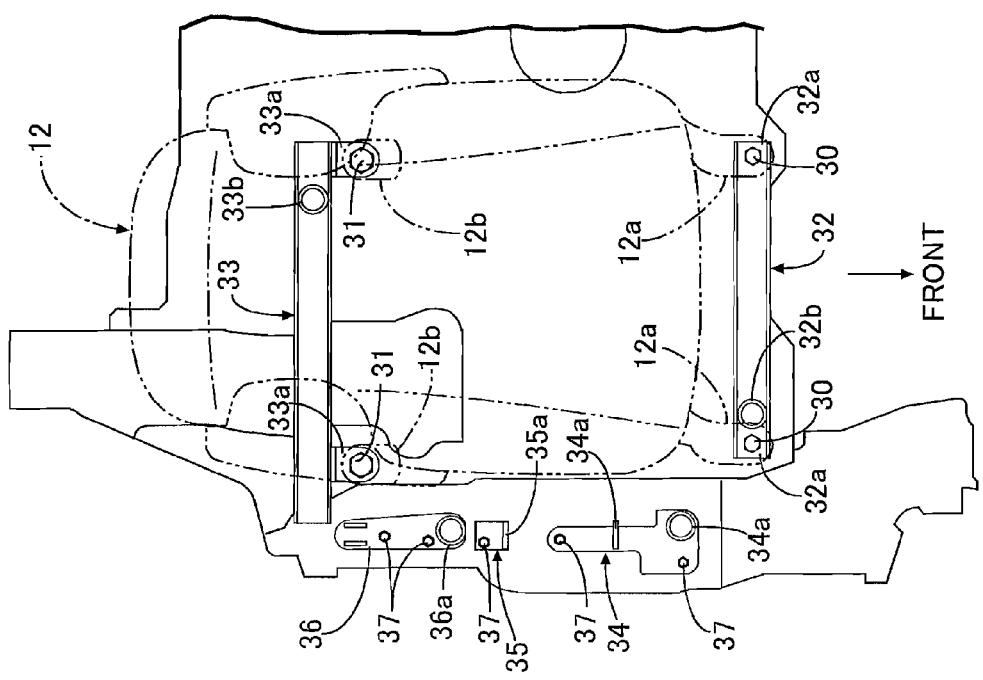

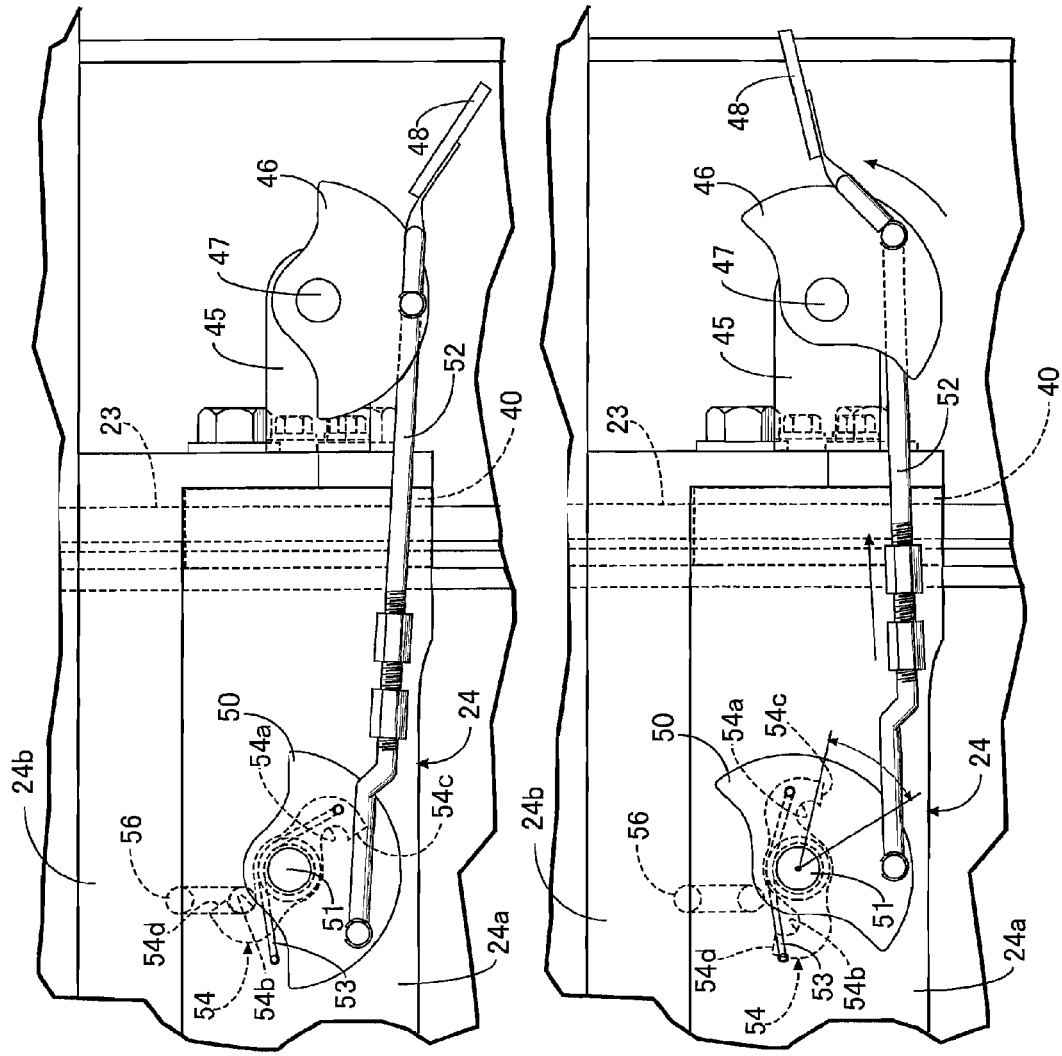

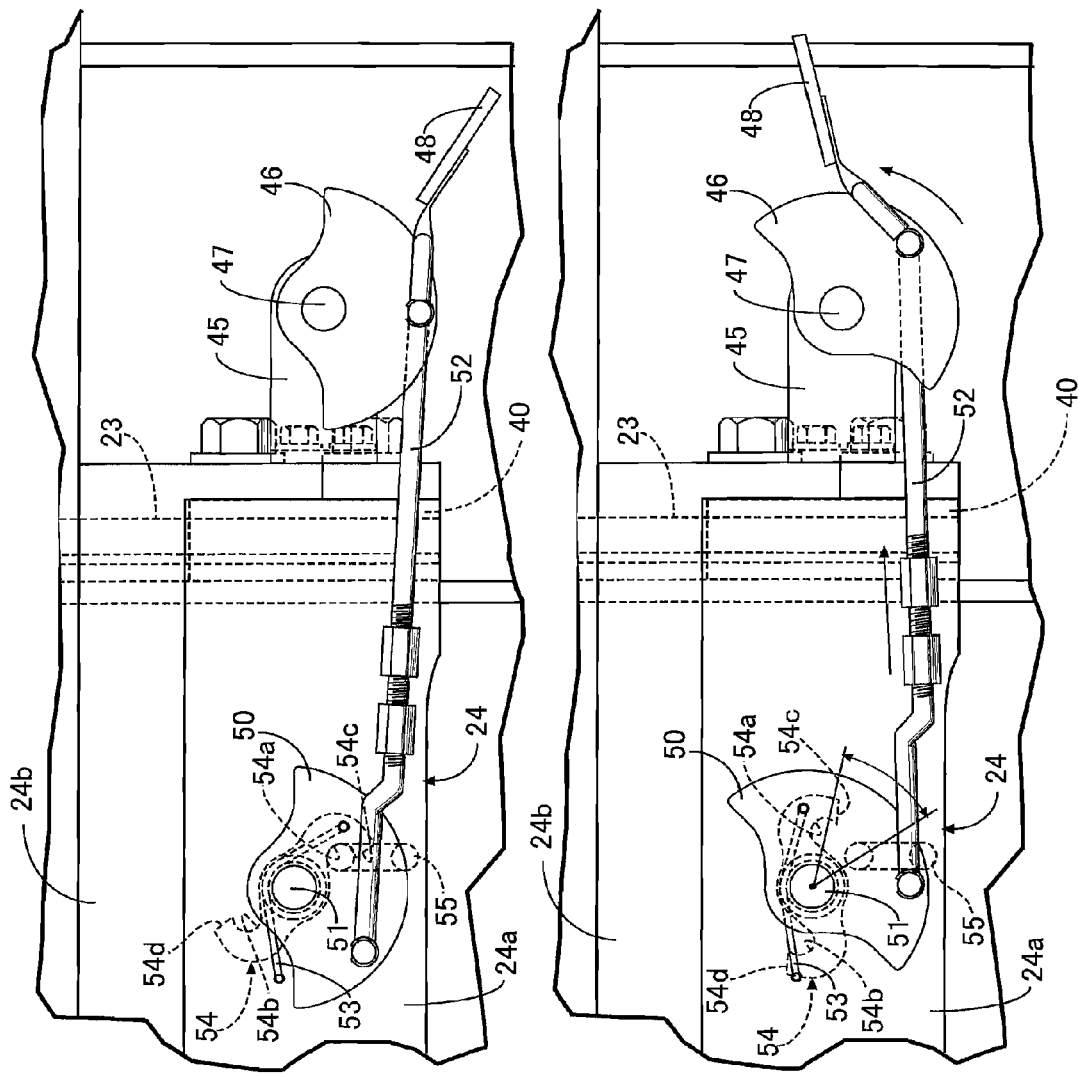

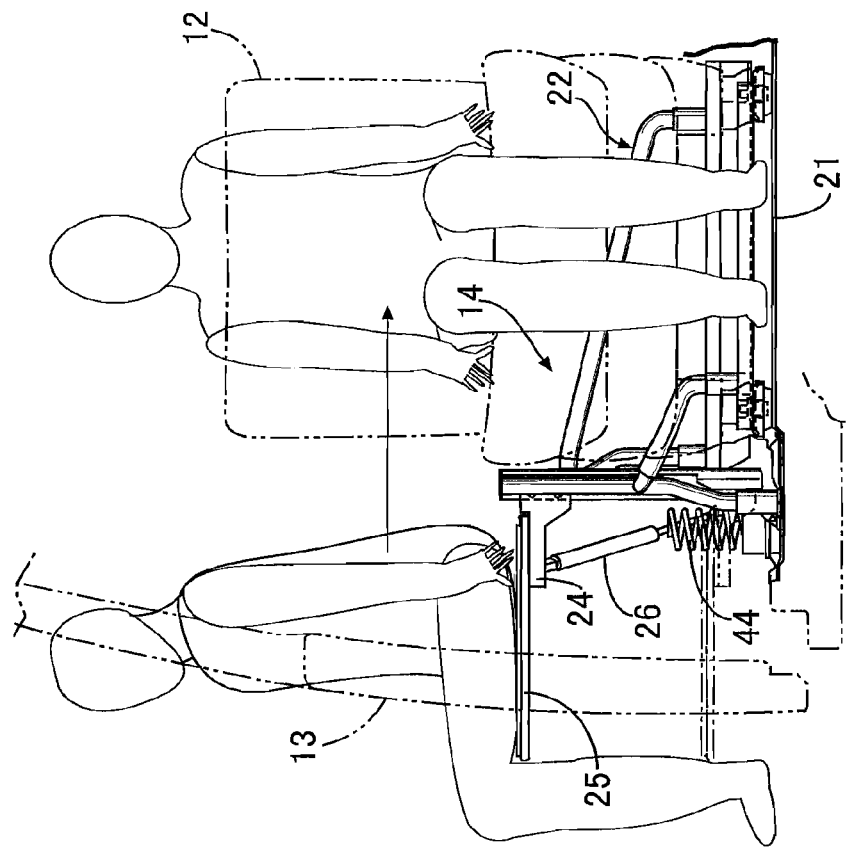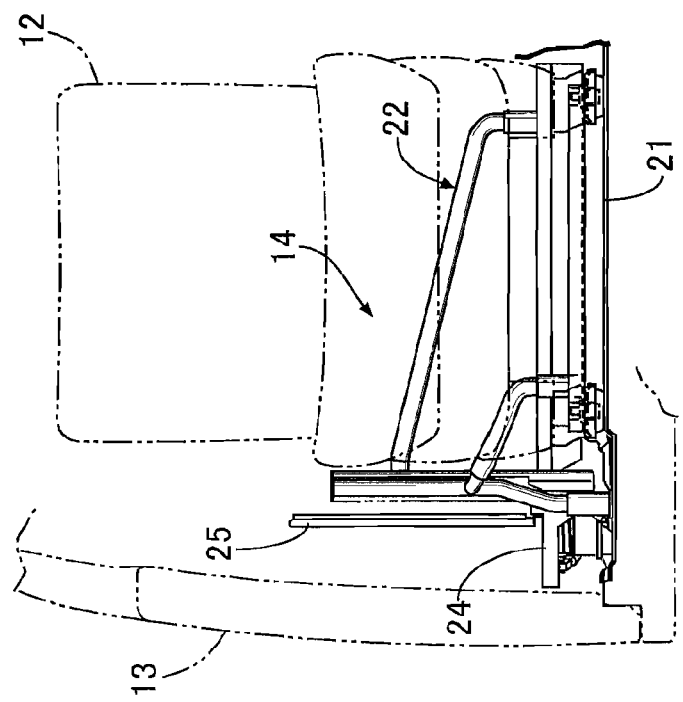

FIRST EMBODIMENT

FIG.17 LOWERED POSITION

RAISED POSITION

INTERMEDIATE POSITION

LOWERED POSITION

OCCUPANT TRANSFER APPARATUS FOR VEHICLE

BACKGROUND OF THE INVENTION

Field of the Invention

The present invention relates to an occupant transfer apparatus for a vehicle, comprising a transfer board which is provided between a seat and a door in such a way as to be raisable and lowerable and to be foldable.

Description of the Related Art

The following apparatus is publicly known from Japanese Patent Application Laid-open No. 2009-82568. The apparatus includes: vertical rails arranged between a vehicle seat and a door; a lift base which rises and lowers along the vertical rails by use of drive force of a motor; and an assist seat supported on the lift base in such a way as to be turnable between a horizontally outward position and a vertically upward position. The assist seat with an assisted person sitting thereon is raised and lowered between the height of a wheelchair and the height of the vehicle seat, so as to assist transfer of the assisted person from the wheelchair onto the vehicle seat and transfer of the assisted person from the vehicle seat onto the wheelchair.

However, the apparatus described in Japanese Patent Application Laid-open No. 2009-82568 uses drive force of the motor to raise and lower the assist seat, and thus requires a motor, a battery, wires, a control device, and so on. This complicates the structure and hence leads to a problem of increased weight and cost.

SUMMARY OF THE INVENTION

The present invention has been made in view of the above circumstance, and an object thereof is to provide an occupant transfer apparatus for a vehicle capable of transferring an assisted person between a wheelchair and a vehicle seat without needing any drive source such as a motor.

In order to achieve the object, according to a first feature of the present invention, there is provided an occupant transfer apparatus for a vehicle, comprising: a transfer board which is provided between a seat and a door in such a way as to be raisable and lowerable and to be foldable; and an elastic member which generates elastic force that biases the transfer board upward.

According to the above configuration, the occupant transfer apparatus includes: the transfer board which is provided between the seat and the door in such a way as to be raisable and lowerable and to be foldable; and the elastic member which generates the elastic force that biases the transfer board upward. Thus, by balancing the elastic force of the elastic member with the weight of an assisted person, the assisted person can be raised and lowered with very small force. Moreover, because there is no need for a special drive source, the structure can be realized at low cost and also be made compact. This prevents the structure from narrowing a vehicle-compartment space and obstructing an able-bodied person getting in and out of the vehicle.

According to a second feature of the present invention, in addition to the first feature, the transfer board is supported by a slide unit which is raisable and lowerable along a guide rail arranged substantially along an up-down direction between the seat and the door, and the elastic member connects a floor panel and the slide unit.

According to the above configuration, the transfer board is supported by the slide unit which is raisable and lowerable along the guide rail arranged substantially along the up-down direction between the seat and the door, and the elastic member connects the floor panel and the slide unit. Thus, the transfer board can be raised and lowered in a stable posture.

According to a third feature of the present invention, in addition to the second feature, an upper end portion and a lower end portion of the elastic member are fixed to the slide unit and the floor panel, respectively, and an attachment angle of the elastic member with respect to the floor panel is adjustable by changing a position of at least one of a fixing part fixing the upper end portion to the slide unit and a fixing part fixing the lower end portion to the floor panel.

According to the above configuration, the upper end portion and the lower end portion of the elastic member are fixed to the slide unit and the floor panel, respectively, and the attachment angle of the elastic member with respect to the floor panel is adjustable by changing the position of at least one of the fixing portion fixing the upper end portion to the slide unit and the fixing portion fixing the lower end portion to the floor panel. Thus, the elastic member is inclined upward in the case of an assisted person of a large weight, whereas the elastic member is inclined downward in the case of an assisted person of a small weight. In this way, the elastic force in the up-down direction generated by the elastic member can be adjusted to a level suitable for the weight.

According to a fourth feature of the present invention, in addition to the third feature, the upper end portion of the elastic member is offset from the lower end portion thereof toward an outer side in a vehicle width direction.

According to the above configuration, the upper end portion of the elastic member is offset from the lower end portion thereof toward the outer side in the vehicle width direction. Thus, the elastic member more effectively supports the slide unit which receives the weight of an assisted person sitting on the transfer board. This can prevent a situation where an outer end of the transfer board in the vehicle width direction is tilted downward, thus obstructing smooth raising and lowering.

According to a fifth feature of the present invention, in addition to the second feature, an assist elastic member which biases the slide unit upward is arranged between the floor panel and the slide unit.

According to the above configuration, the assist elastic member which biases the slide unit upward is arranged between the floor panel and the slide unit. Thus, the elastic force of the assist elastic member assists the elastic force of the elastic member at the start of rise of the transfer board. Accordingly, the rise of the transfer board can be smoothly started by applying small force.

According to a sixth feature of the present invention, in addition to the first feature, the door is a slide door.

According to the above configuration, the door is the slide door. Thus, the door thickness can be made small. Accordingly, it is possible to easily secure a space to arrange the occupant transfer apparatus, and, in addition, to prevent the open door from obstructing transfer of an assisted person.

According to a seventh feature of the present invention, in addition to the sixth feature, a vehicle-compartment-side surface of a door lining of the door is substantially flat.

According to the above configuration, the vehicle-compartment-side surface of the door lining of the door is substantially flat. Thus, the door lining never interferes with the occupant transfer apparatus when the door is opened or closed.

According to an eighth feature of the present invention, in addition to the first feature, there is provided the occupant transfer apparatus for a vehicle, further comprising a plurality of four-link mechanisms arranged between the seat and the door, wherein each of the four-link mechanisms includes: a first longitudinal link fixed to a vehicle body and extending substantially in an up-down direction; first and second lateral links having inner ends in a vehicle width direction pivotally supported by upper and lower ends of the first longitudinal link, respectively; and a second longitudinal link extending substantially in the up-down direction and having upper and lower ends pivotally supported by outer ends, in the vehicle width direction, of the first and second lateral links, and the transfer board is foldably supported by the second longitudinal link.

According to the above configuration, each of the plurality of four-link mechanisms arranged between the seat and the door includes: the first longitudinal link fixed to the vehicle body and extending substantially in the up-down direction; the first and second lateral links having the inner ends in the vehicle width direction pivotally supported by the upper and lower ends of the first longitudinal link, respectively; and the second longitudinal link extending substantially in the up-down direction and having the upper and lower ends pivotally supported by the outer ends, in the vehicle width direction, of the first and second lateral links, and the transfer board is foldably supported by the second longitudinal link. Thus, as the second longitudinal link lowers, the transfer board gets away diagonally from a lateral side of the vehicle body, thereby making transfer from and onto the wheelchair easy. As the second longitudinal link rises, the transfer board approaches diagonally to the lateral side of the vehicle body, thereby making transfer from and onto the seat easy.

According to a ninth feature of the present invention, in addition to the eighth feature, the elastic member biases the transfer board upward by pushing a coupling member that allows the plurality of four-link mechanisms to move in conjunction with each other.

According to the above configuration, the elastic member biases the transfer board upward by pushing the coupling member that allows the plurality of four-link mechanisms to move in conjunction with each other. Thus, the biasing force of the elastic member can be distributed evenly to the plurality of four-link mechanisms. Accordingly, the transfer board can be raised and lowered in a stable posture.

According to a tenth feature of the present invention, in addition to the ninth feature, the elastic member is arranged under the seat.

According to the above configuration, the elastic member is arranged under the seat. This can prevent the elastic member from obstructing the transfer of an assisted person and prevent the elastic member from narrowing the vehicle-compartment space.

Note that a gas damper 26 and a gas damper 146 in embodiments correspond to the elastic member of the present invention. An upper joint 42 and a lower joint 43 in the embodiment correspond to the fixing parts of the present invention. A coil spring 44 in the embodiment corresponds to the assist elastic member of the present invention.

The above and other objects, characteristics and advantages of the present invention will be clear from detailed descriptions of the preferred embodiments which will be provided below while referring to the attached drawings.

BRIEF DESCRIPTION OF THE DRAWINGS

FIGS. 1 to 11B show a first embodiment of the present invention:

FIG. 1 is a right-side view of a vehicle equipped with an occupant transfer apparatus;

FIG. 2 is an enlarged view of a main part of FIG. 1 (a raised state of a transfer board);

FIG. 3 is a view seen in the direction of an arrow 3 in FIG. 2 (the raised state of the transfer board);

FIG. 4 is a view corresponding to FIG. 2 (a lowered state of the transfer board);

FIG. 5 is a view seen in the direction of an arrow 5 in FIG. 4;

FIGS. 6A and 6B are plan views of a floor panel;

FIGS. 7A and 7B are enlarged views of an area 7 in FIG. 2 (the raised state of the transfer board);

FIGS. 8A and 8B are enlarged views of an area 8 in FIG. 4 (the lowered state of the transfer board);

FIG. 9 is a perspective view of a lock mechanism;

FIGS. 10A and 10B are operation explanatory views of transfer;

FIG. 11B is a view showing interior members of a slide door (the first embodiment).

FIGS. 12 to 21B show a second embodiment of the present invention:

FIG. 12 is a left-side view of a vehicle equipped with an occupant transfer apparatus;

FIG. 13 is an enlarged view of a main part of FIG. 12 (a raised position);

FIG. 14 is a view seen in the direction of an arrow 14 in FIG. 13 (the raised position, a use state of a transfer board);

FIG. 15 is a view corresponding to FIG. 14 (the raised position, a stored state of the transfer board);

FIG. 16 is a view corresponding to FIG. 14 (an intermediate position);

FIG. 17 is a view corresponding to FIG. 14 (a lowered position);

FIG. 18 is a perspective view of the occupant transfer apparatus (the raised position);

FIG. 19 is a perspective view of the occupant transfer apparatus (the intermediate position);

FIG. 20 is a perspective view of the occupant transfer apparatus (the lowered position); and FIGS. 21A and 21B are explanatory views of transfer of an assisted person.

DESCRIPTION OF THE PREFERRED EMBODIMENTS

Hereinbelow, a first embodiment of the present invention will be described based on FIGS. 1 to 11B. Note that a front-rear direction, a left-right direction (vehicle width direction), and an up-down direction in this specification are defined based on an occupant sitting on a driver seat.

Figure 1:
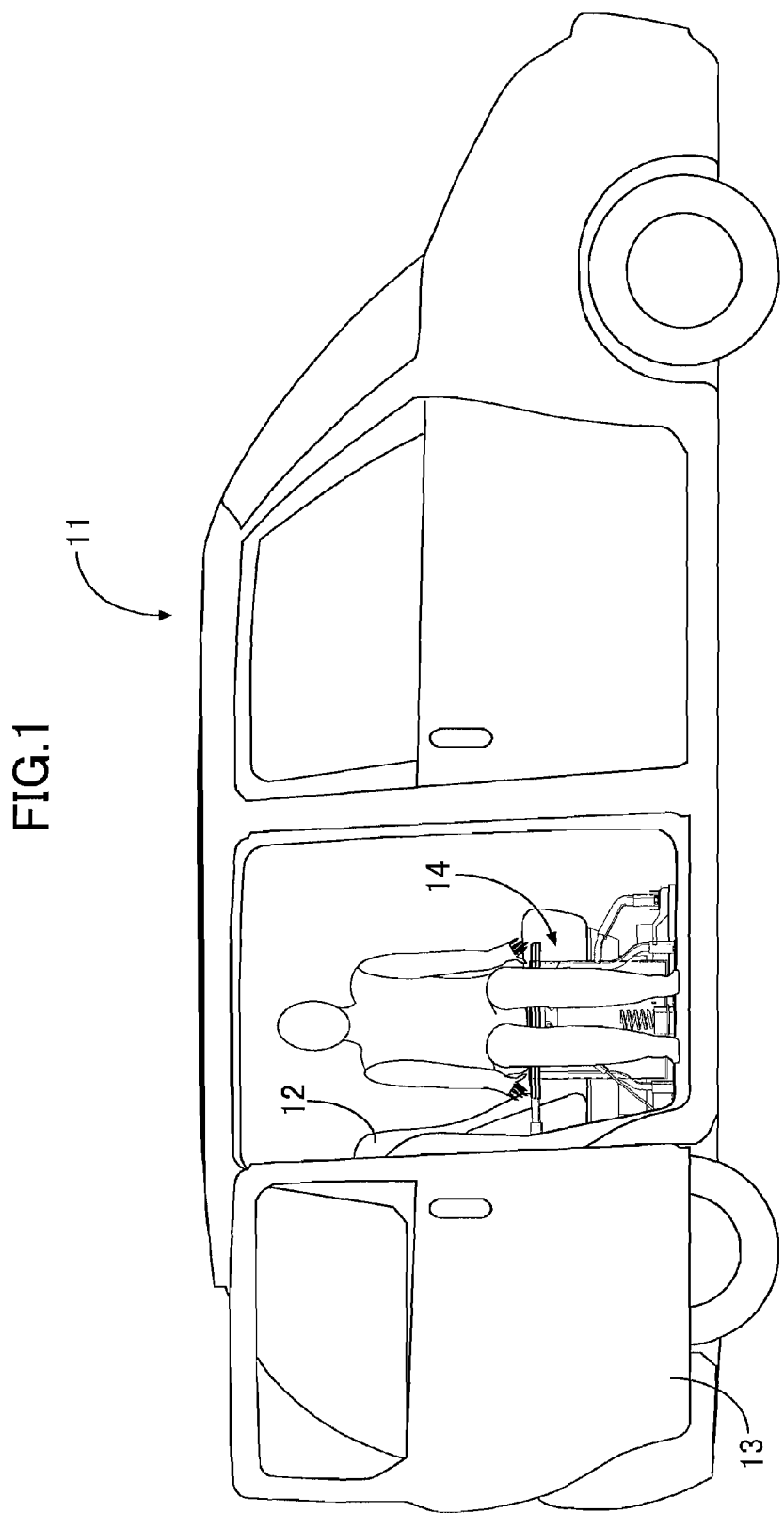

As shown in FIG. 1, a door 13 capable of sliding rearward faces a right side of a right seat 12 in the second row from the front of a vehicle 11. An occupant transfer apparatus 14 which assists transfer of an assisted person between a wheelchair and the right seat 12 is arranged in a space located between an outer side of the right seat 12 in the vehicle width direction and an inner side of the door 13 in the vehicle width direction.

As shown in FIGS. 2 to 6B and 9, the occupant transfer apparatus 14 includes: a frame 22 fixed to a floor panel 21 of a vehicle body; a pair of guide rails 23, 23 fixed to the frame 22 in the up-down direction; a slide unit 24 supported on the guide rails 23, 23 in such a way as to be raisable and lowerable; a transfer board 25 supported on the slide unit 24 in such a way as to be foldable; and a gas damper 26 connecting the slide unit 24 and the floor panel 21.

The frame 22 is formed of a base frame 27, a front frame 28, and a rear frame 29. The base frame 27 includes a plate-shaped body part 27a extending in the front-rear direction and the up-down direction and a pair of front and rear reinforcing pipes 27b, 27c extending in the up-down direction along front and rear edges of the body part 27a. The front frame 28 made of a pipe member extends forward from one end thereof which is joined to an intermediate portion, in the up-down direction, of the front reinforcing pipe 27b of the base frame 27 and further extends downwardly inward in the vehicle width direction, and has a downwardly extending fixing portion 28a at the other end. The rear frame 29 made of a pipe member extends rearward from one end thereof which is joined to an upper end portion of the rear reinforcing pipe 27c of the base frame 27 and further extends downwardly inward in the vehicle width direction, and has a downwardly extending fixing portion 29a at the other end.

Figure 2:
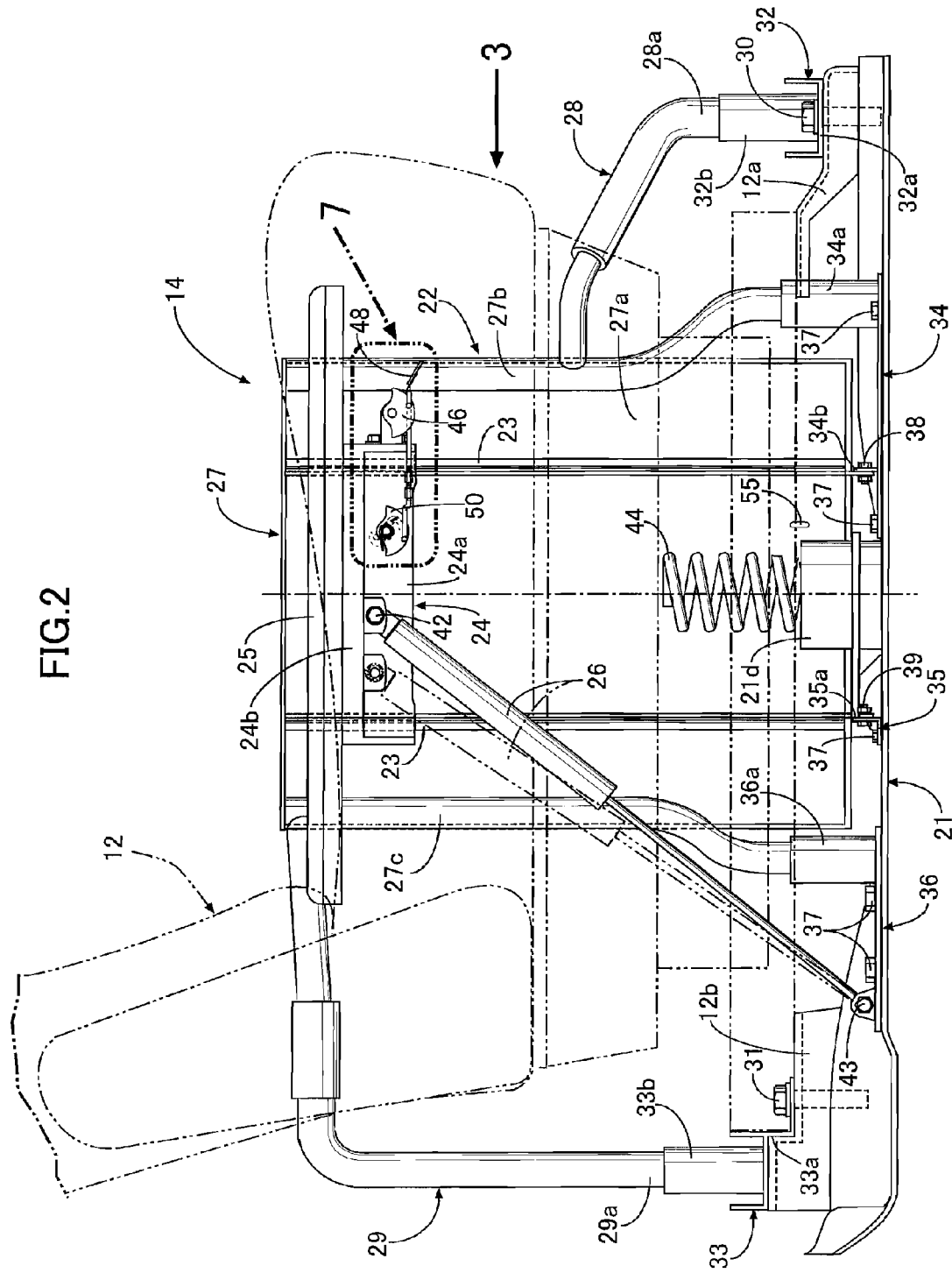
Figure 3:
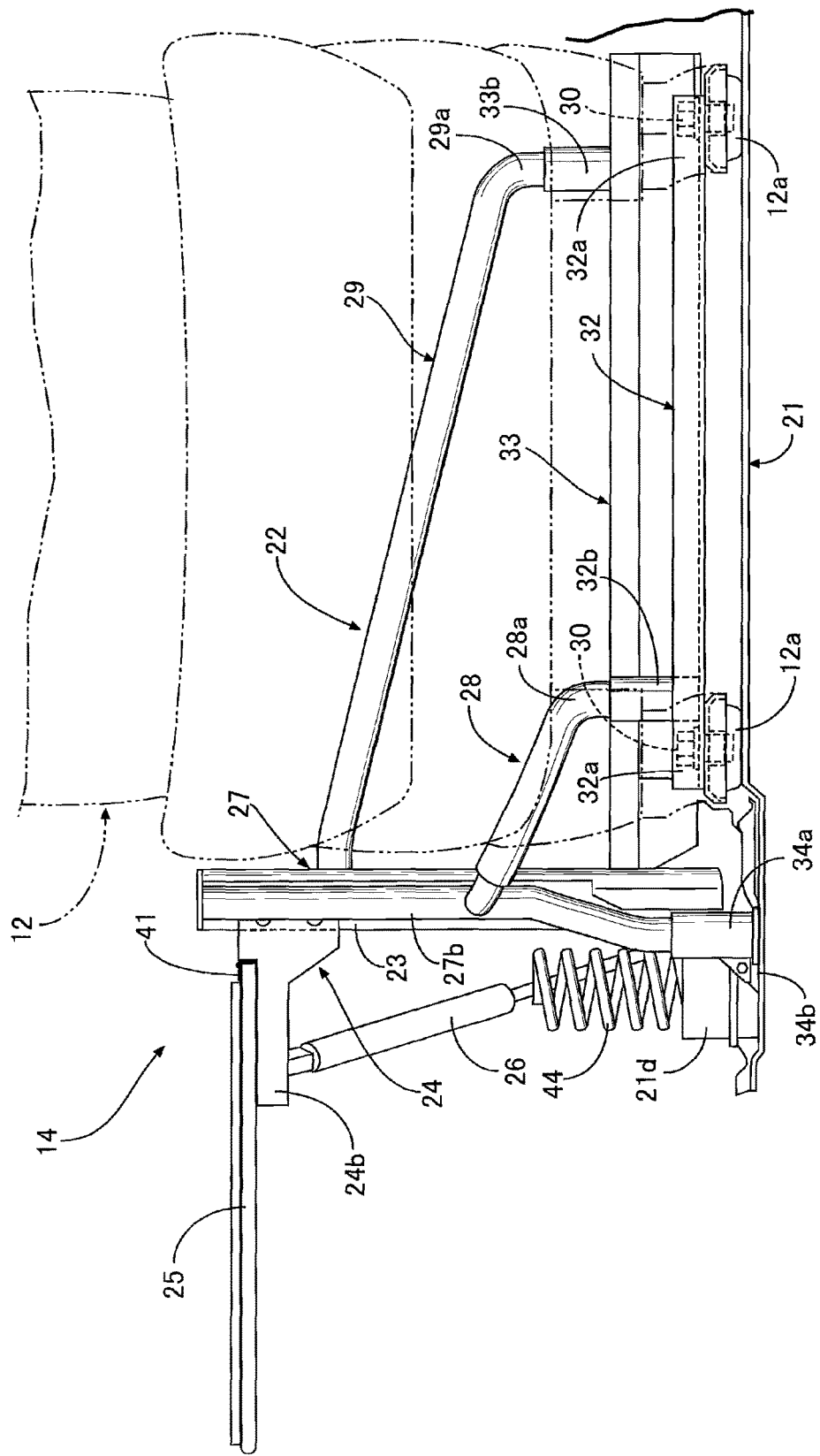
Figure 9:
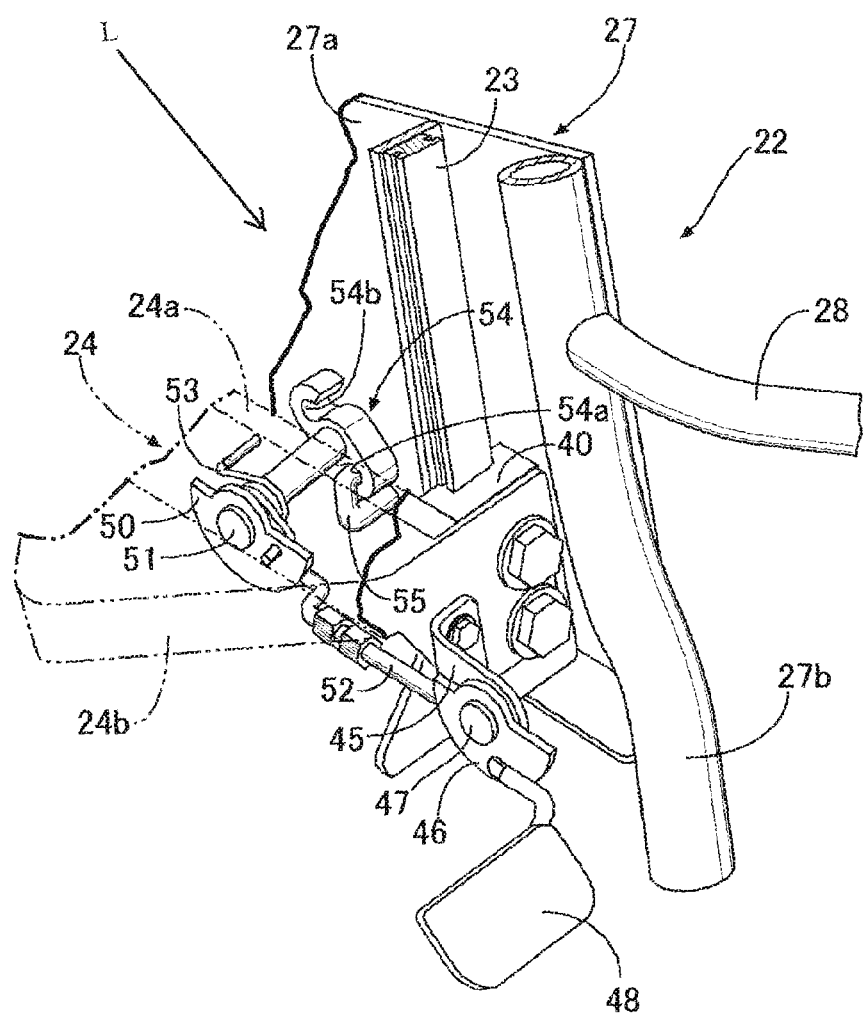

The seat 12 includes a pair of left and right seat front leg portions 12a, 12a on a front side thereof (see FIGS. 2 and 6A), and a pair of left and right seat rear leg portions 12b, 12b on a rear side thereof (see FIGS. 2 and 6A). In the floor panel 21, there are formed a pair of left and right front attachment holes 21a, 21a for fixing the seat front leg portions 12a, 12a with bolts 30, 30, and a pair of left and right rear attachment holes 21b, 21b for fixing the seat rear leg portions 12b, 12b with bolts 31, 31 (see FIG. 6B). Moreover, in an outer end portion of the floor panel 21 in the vehicle width direction along an inner surface of the door 13, there are formed multiple component attachment holes 21c . . . for fixing vehicular components such as fixtures for wire harnesses (see FIG. 6B).

When the seat front leg portions 12a, 12a are fixed to the front attachment holes 21a, 21a of the floor panel 21 with the bolts 30, 30, attachment portions 32a, 32a at opposite ends of a rod-shaped front bracket 32 extending in the vehicle width direction are laid over upper surfaces of the seat front leg portions 12a, 12a and fastened together. Moreover, when the seat rear leg portions 12b, 12b are fixed to the rear attachment holes 21b, 21b of the floor panel 21 with the bolts 31, 31, attachment portions 33a, 33a at opposite ends of a rod-shaped rear bracket 33 extending in the vehicle width direction are laid over upper surfaces of the seat rear leg portions 12b, 12b and fastened together. Further, first to third center brackets 34, 35, 36 are fixed to the component attachment holes 21c of the floor panel 21 with bolts 37.

A pipe-shaped front-frame support portion 32b is provided at the outer end, in the vehicle width direction, of the front bracket 32. The fixing portion 28a of the front frame 28 is fitted and fixed to this front-frame support portion 32b. Moreover, a pipe-shaped rear-frame support portion 33b is provided at the inner end, in the vehicle width direction, of the rear bracket 33. The fixing portion 29a of the rear frame 29 is fitted and fixed to this rear-frame support portion 33b.

Further, a lower end of the front reinforcing pipe 27b of the base frame 27 is fitted and fixed to a pipe-shaped reinforcing-pipe support portion 34a provided to the front first center bracket 34, and a lower end portion of the body part 27a of the base frame 27 is fixed with a bolt 38 to a plate-shaped fixing portion 34b provided to the first center bracket 34. Moreover, a lower end portion of the body part 27a of the base frame 27 is fixed with a bolt 39 to a plate-shaped fixing portion 35a provided to the second center bracket 35, and a lower end of the rear reinforcing pipe 27c of the base frame 27 is fitted and fixed to a pipe-shaped reinforcing-pipe support portion 36a provided to the third center bracket 36.

Thus, the frame 22 of the occupant transfer apparatus 14 is fixed detachably by utilizing the existing front attachment holes 21a, 21a, rear attachment holes 21b, 21b, and component attachment holes 21c provided in the floor panel 21.

The pair of guide rails 23, 23 extending in the up-down direction are fixed to an outer surface, in the vehicle width direction, of the body part 27a of the base frame 27. A pair of sliders 40, 40 (see FIG. 9) provided at front and rear ends of a rectangular plate-shaped sidewall portion 24a of the slide unit 24 are slidably engaged with the pair of guide rails 23, 23. A triangular upper wall portion 24b projects from an outer surface, in the vehicle width direction, of the sidewall portion 24a of the slide unit 24, and the transfer board 25 is pivotally supported on an upper portion of the sidewall portion 24a through a hinge 41 (see FIGS. 3 and 5). The transfer board 25 is manually swingable between a projecting position (see a solid line in FIG. 5) at which the transfer board 25 projects laterally outward in the vehicle width direction and is supported on an upper surface of the upper wall portion 24b and a stored position (see a chain line in FIG. 5) at which the transfer board 25 stands upright along the outer surface, in the vehicle width direction, of the body part 27a of the base frame 27.

An upper end of the gas damper 26 is fixed to a lower surface of the upper wall portion 24b of the slide unit 24 through an upper joint 42, while a lower end of the gas damper 26 is fixed to a rear end of the third center bracket 36 through a lower joint 43. In a front view, the upper end of the gas damper 26 is offset from the lower end toward an outer side in the vehicle width direction (see FIG. 3). In a side view, the upper end of the gas damper 26 is offset from the lower end toward a front side (see FIG. 2). The position of the upper joint 42 is changeable to any one of two locations on the upper wall portion 24b of the slide unit 24 which are separated from each other in the front-rear direction (see FIG. 2).

A lower end of a coil spring 44 is supported on a spring support member 21d provided to the floor panel 21. An upper end of the coil spring 44 faces and is capable of contact with the lower surface of the upper wall portion 24b of the slide unit 24, and is compressed downwardly as the slide unit 24 is lowered.

As shown in FIGS. 7A to 9, a semicircular first swing plate 46 is pivotally supported on a pivot shaft 47 at a front end of the slide unit 24 through a bracket 45. An operation lever 48 protrudes forward from the first swing plate 46. Moreover, a semicircular second swing plate 50 is pivotally supported on a pivot shaft 51 on the sidewall portion 24a of the slide unit 24. The first swing plate 46 and the second swing plate 50 are coupled by a link 52. The second swing plate 50 is biased clockwise by a torsion spring 53.

A center portion of an S-shaped hook 54 is fixed to the pivot shaft 51 for the second swing plate 50. A lower striker 55 which a first engagement portion 54a of the hook 54 in a lower side thereof can be engaged with forms part of a lock mechanism L and is fixed to a lower portion of the body part 27a of the base frame 27. An upper striker 56 which a second engagement portion 54b of the hook 54 in an upper side thereof can be engaged with forms part of the lock mechanism L and is fixed to an upper portion of the body part 27a of the base frame 27. A first cam surface 54c is formed near the first engagement portion 54a of the hook 54, and a second cam surface 54d is formed near the second engagement portion 54b of the hook 54.

Figure 11B:
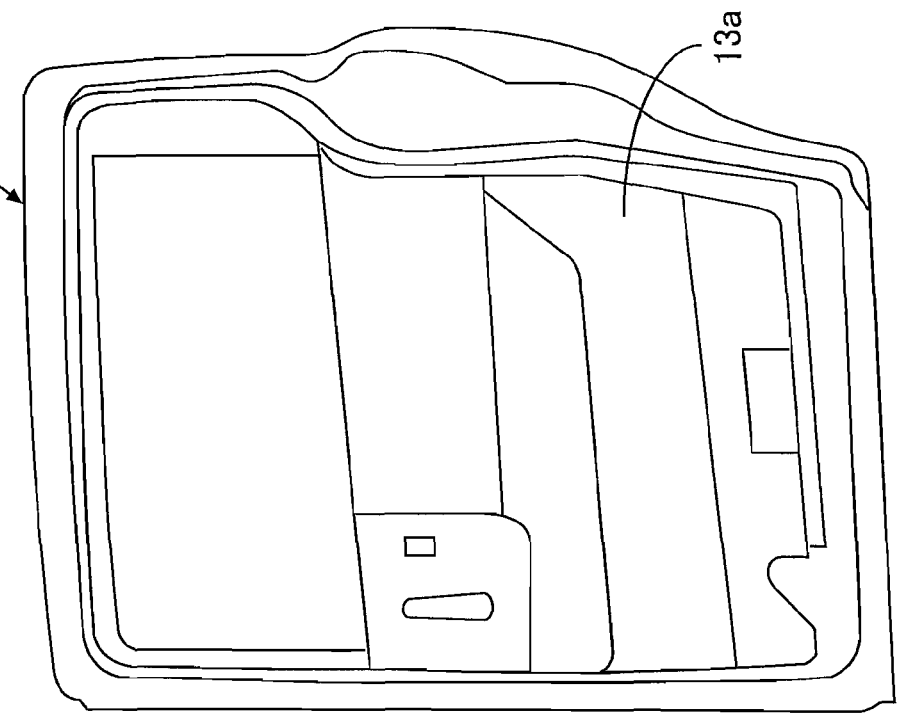
Figure 11A:
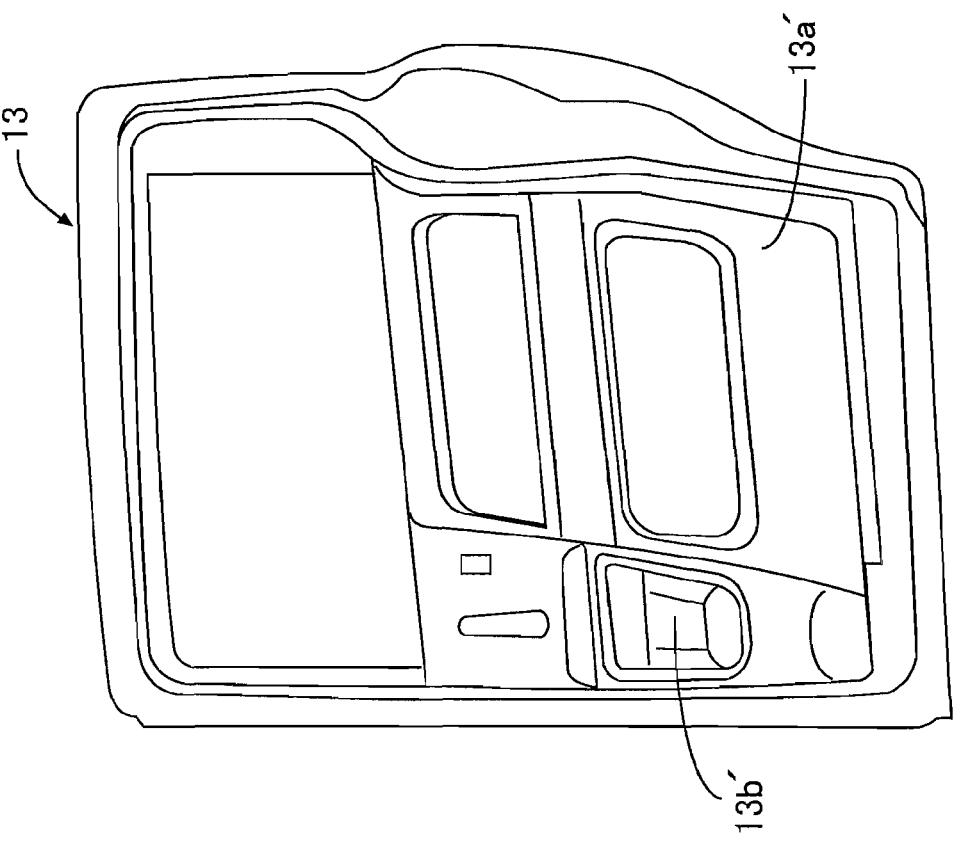
FIG. 11A is a view showing interior members of a slide door (prior art)

As shown in FIGS. 11A and 11B, a door lining 13a' of the door 13 of the vehicle 11 not equipped with the occupant transfer apparatus 14 has protruding objects such as a cup holder 13b' projecting to the inside of the vehicle-compartment; however, a door lining 13a of the door 13 of the vehicle 11 equipped with the occupant transfer apparatus 14 is replaced with one without protruding objects such as the cup holder 13b' protruding to the inside of the vehicle-compartment.

Next, operations of the embodiment of the present invention having the above configuration will be described.

To transfer an assisted person on a wheelchair onto the seat 12 of the vehicle 11, a caregiver first opens the door 13 from a state of FIG. 10A, pulls down the transfer board 25 of the slide unit 24, locked by the lock mechanism L at its lowered position, from the stored position to the projecting position at which the transfer board 25 projects laterally outward in the vehicle width direction, and then moves the assisted person on the wheelchair onto the transfer board 25.

Thereafter, as shown in FIG. 8B, the caregiver pulls up the operation lever 48 against the elastic force of the torsion spring 53 and thus swings the first swing plate 46 counterclockwise. As a result, the second swing plate 50 is swung counterclockwise through the link 52, and the hook 54 integral with the second swing plate 50 is turned counterclockwise, thereby disengaging the first engagement portion 54a from the lower striker 55, so that the lock mechanism L is in a lock-release state. The transfer board 25 can now rise together with the slide unit 24.

Here, the elastic force of the gas damper 26 and the coil spring 44 is set slightly smaller than the weight of the assisted person. Hence, as the caregiver raises the transfer board 25 upward or as the assisted person kicks the ground, the transfer board 25 rises together with the slide unit 24 along the guide rails 23, 23 as shown in FIG. 10B. As the slide unit 24 rises, the second cam surface 54d of the second engagement portion 54b of the hook 54 comes into contact with the upper striker 56, thereby turning the hook 54 counterclockwise against the elastic force of the torsion spring 53. After the second cam surface 54d passes over the upper striker 56, the second engagement portion 54b is automatically engaged with the upper striker 56 by the elastic force of the torsion spring 53, so that the slide unit 24 is locked by the lock mechanism L at a raised position as shown in FIG. 7A. When the slide unit 24 reaches the raised position, the transfer board 25 is at substantially the same height as a sitting surface of the seat 12. Thus, the assisted person can now move into the vehicle-compartment from the transfer board 25 to be transferred onto the seat 12.

Once the assisted person is transferred onto the seat 12 as described above, the caregiver pulls up the operation lever 48 to disengage the second engagement portion 54b of the hook 54 from the upper striker 56 as shown in FIG. 7B. Then, the caregiver pushes down the transfer board 25 against the elastic force of the gas damper 26 and the coil spring 44, so that the first engagement portion 54a of the hook 54 is automatically engaged with the lower striker 55 due to an operation of the first cam surface 54c, as shown in FIG. 8A. As a result, the slide unit 24 is locked at the lowered position. Thus, by folding the transfer board 25 upward from the projecting position to the stored position as shown in FIG. 10A, the door 13 can be closed without interfering with the transfer board 25.

Transferring the assisted person from the seat 12 onto the wheelchair involves the opposite operations to those described above. The caregiver opens the door 13 and pulls down the transfer board 25 to the projecting position. Then, the caregiver raises the slide unit 24 from the lowered position to the raised position and locks the slide unit 24 there. Thereafter, the caregiver moves the assisted person from the seat 12 onto the transfer board 25. Subsequently, the caregiver operates the operation lever 48 to disengage the second engagement portion 54b of the hook 54 from the upper striker 56. Because the weight of the assisted person is greater than the elastic force of the gas damper 26, the transfer board 25 lowers while compressing the gas damper 26. Further, after lowering a while, the transfer board 25 starts to compress the coil spring 44 and reaches the lowered position. As a result, the first engagement portion 54a of the hook 54 is automatically engaged with the lower striker 55, thereby locking the transfer board 25. Subsequently, the caregiver moves the assisted person from the transfer board 25 onto the wheelchair. By folding the transfer board 25 upward from the projecting position to the stored position, the door 13 can be closed without interfering with the transfer board 25.

As described above, the gas damper 26 connects the floor panel 21 and the slide unit 24, and the elastic force of the gas damper 26 biases the slide unit 24 upward. Thus, by balancing the elastic force of the gas damper 26 with the weight of the assisted person, the assisted person can be raised and lowered with very small force. Moreover, because there is no need for a special drive source such as a motor, the structure can be realized at low cost and also be made compact. This prevents the structure from narrowing the vehicle-compartment space and obstructing an able-bodied person getting in and out of the vehicle.

Meanwhile, in the case of an assisted person of a different weight, the position of the upper joint 42 of the gas damper 26 on the slide unit 24 may be changed in the front-rear direction (see FIG. 2). In this way, the above case can be handled without changing the gas damper 26 itself. Specifically, as the position of the upper joint 42 moves forward, the inclination angle of the gas damper 26 with respect to the up-down direction increases, thereby reducing a component of the elastic force of the gas damper 26 in the up-down direction. As a result, elastic force suitable for a person of a small weight can be obtained. In contrast, as the position of the upper joint 42 moves rearward, the inclination angle of the gas damper 26 with respect to the up-down direction decreases, thereby increasing the component of the elastic force of the gas damper 26 in the up-down direction. As a result, elastic force suitable for a person of a large weight can be obtained.

Meanwhile, when the slide unit 24 is at the lowered position, the gas damper 26 is in its most leaned posture and therefore the component of the elastic force in the up-down direction is small. This results in a tendency to lack elastic force at the start of rise of the transfer board 25 with an assisted person thereon. However, the elastic force of the coil spring 44 assists the elastic force of the gas damper 26 at the start of the rise of the transfer board 25. Thus, the rise of the transfer board 25 can be smoothly started by applying small force.

Moreover, because the upper end portion of the gas damper 26 is offset from the lower end portion thereof toward the outer side in the vehicle width direction (see FIG. 3), the gas damper 26 more effectively supports the slide unit 24 which receives the weight of an assisted person sitting on the transfer board 25. This can prevent a situation where an outer end of the transfer board 25 in the vehicle width direction is tilted downward, thus obstructing smooth raising and lowering.

Moreover, as shown in FIGS. 2, 6A, and 6B, when the frame 22 of the occupant transfer apparatus 14 is mounted to the vehicle body, the front frame 28 is fixed through the front bracket 32 to the front attachment holes 21*a*, 21*a* of the floor panel 21 for fixing the seat front leg portions 12*a*, 12*a*; the rear frame 29 is fixed through the rear bracket 33 to the rear attachment holes 21*b*, 21*b* of the floor panel 21 for fixing the seat rear leg portions 12*b*, 12*b*; and the base frame 27 is fixed through the first to third center brackets 34, 35, 36 to the component attachment holes 21*c* . . . of the floor panel 21 for fixing onboard components. Thus, the frame 22 can be fixed by utilizing the existing front attachment holes 21*a*, 21*a*, rear attachment holes 21*b*, 21*b*, and component attachment holes 21*c* . . . without performing special alteration on the vehicle body. This allows the vehicle 11 not equipped with the occupant transfer apparatus 14 to be common to the vehicle 11 equipped with it. Accordingly, cost for installing the occupant transfer apparatus 14 can be reduced. Meanwhile, if the occupant transfer apparatus 14 is fixed to an inner wall surface of the vehicle-compartment or to the seat 12 itself, such fixing may possibly obstruct an occupant getting in and out of the vehicle 11 or impair a function of the seat 12. However, by fixing the occupant transfer apparatus 14 to the floor panel 21, the above-mentioned problems can be solved.

Moreover, the front frame 28 is fixed through the front bracket 32 in the vicinity of the front attachment hole 21*a* located on the outer side in the vehicle width direction. Thus, the length of the front frame 28 located in front of the seat 12 is shortened. Accordingly, the front frame 28 can be prevented from obstructing an occupant.

Moreover, the rear frame 29 is fixed through the rear bracket 33 in the vicinity of the rear attachment hole 21*b* located on the inner side in the vehicle width direction. Thus, when the weight of an assisted person sitting on the transfer board 25 exerts a moment that tries to lean the frame 22 to the outer side in the vehicle width direction, that moment is effectively supported by a long moment arm of the rear frame 29. Accordingly, inclination of the frame 22 can be prevented. Even though the rear frame 29 extends a great amount toward to the inner side in the vehicle width direction, the rear frame 29 will never obstruct an occupant because it is at the back of the seat 12.

Moreover, because the door 13 facing the occupant transfer apparatus 14 is a slide door, it can be made thinner than normal doors supported pivotally with hinges. Thus, it is possible to easily secure a space to arrange the occupant transfer apparatus 14 between the door 13 and the seat 12, and, in addition, to secure a wide door opening which makes it even easier for an assisted person to get in and out of the vehicle. Moreover, because a vehicle-compartment-side surface of the door lining 13*a* is substantially flat (see FIG. 11B), the door lining 13*a* never interferes with the occupant transfer apparatus 14 when the door 13 is opened or closed.

Next, a second embodiment of the present invention will be described based on FIGS. 12 to 21B.

Figure 12:
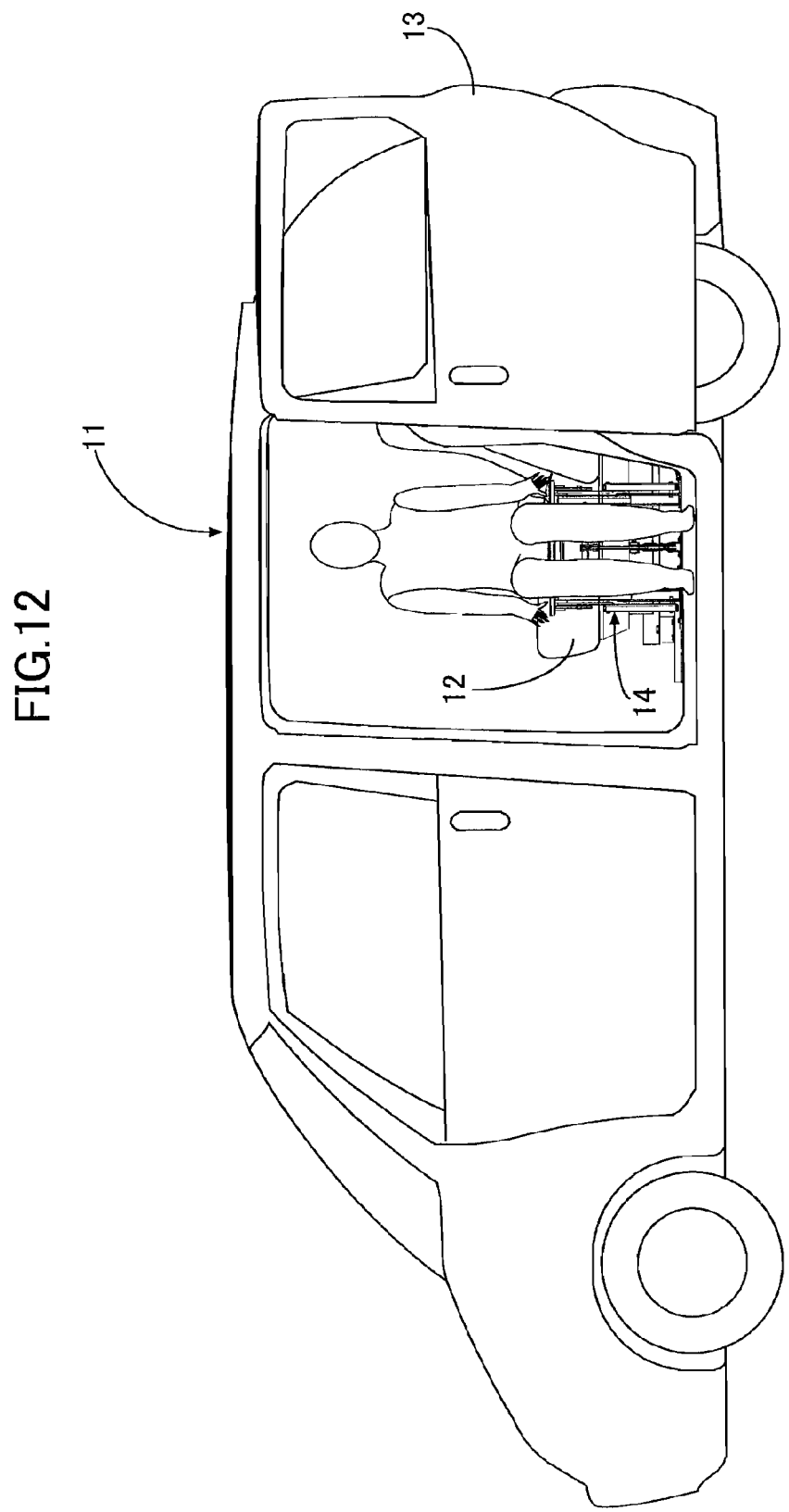

As shown in FIG. 12, a door 13 capable of sliding rearward faces a left side of a left seat 12 in the second row from the front of a vehicle 11. An occupant transfer apparatus 14 which assists transfer of an assisted person between a wheelchair and the left seat 12 is arranged in a space located between an outer side of the left seat 12 in the vehicle width direction and an inner side of the door 13 in the vehicle width direction.

Figure 13:
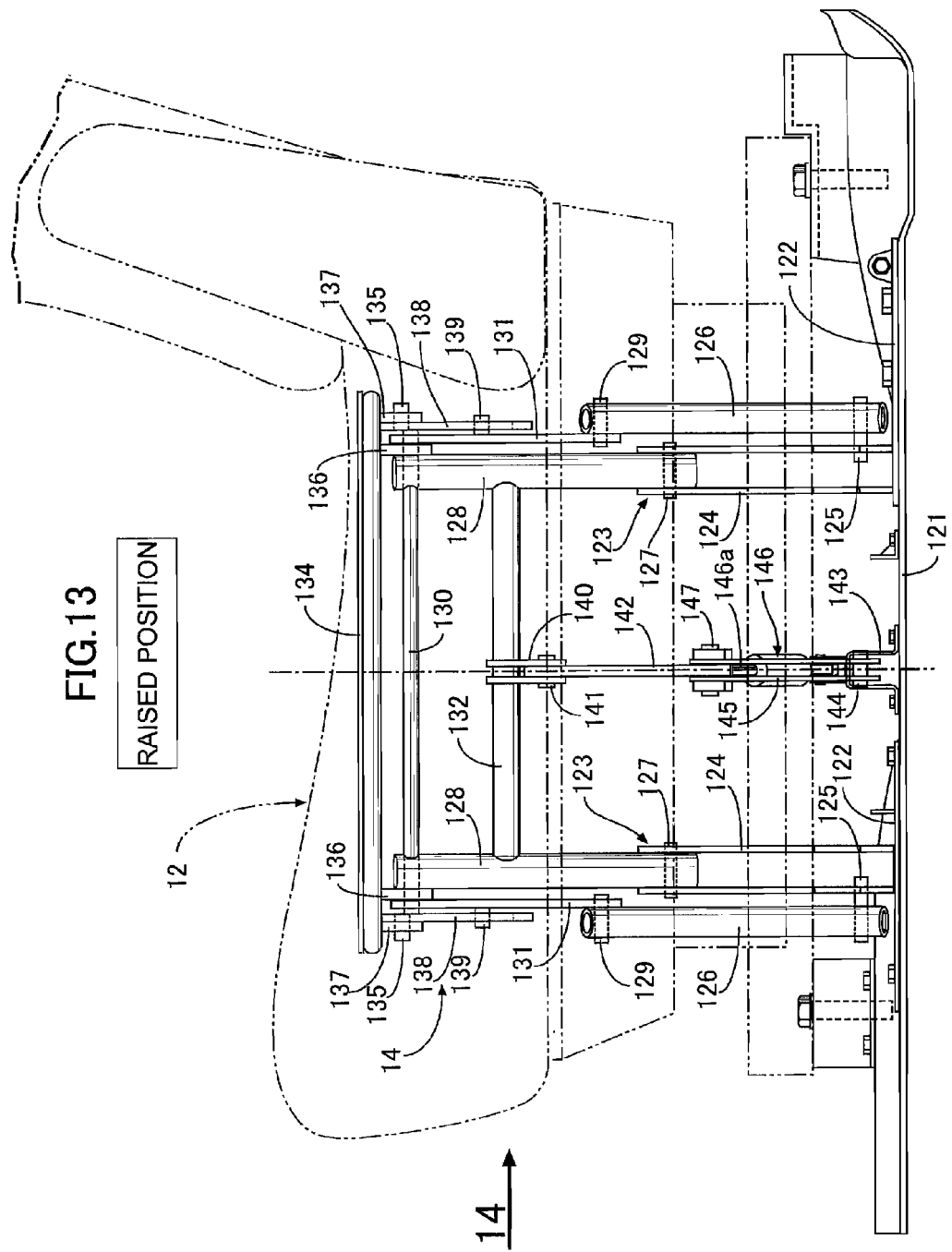
Figure 14:
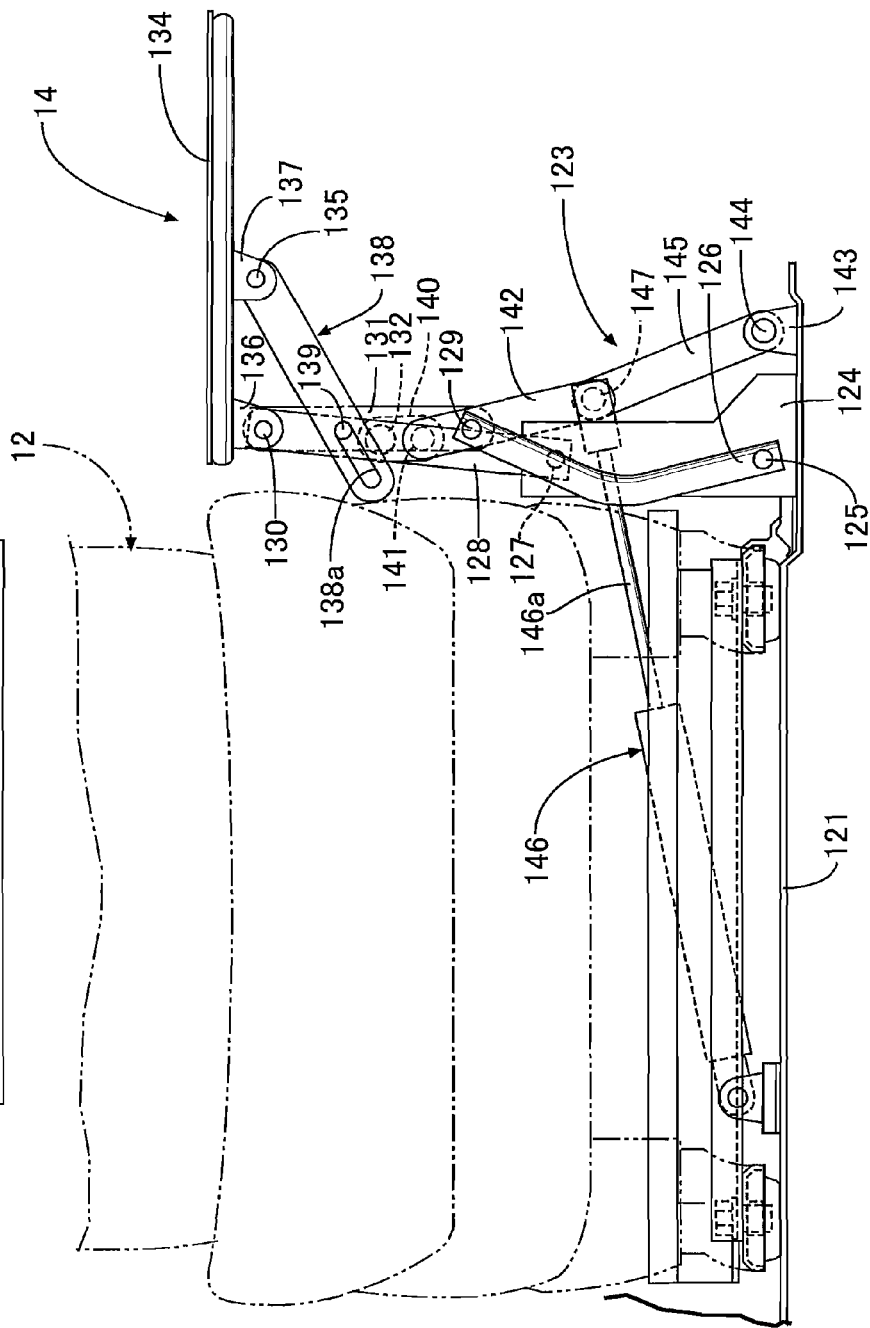
Figure 18:
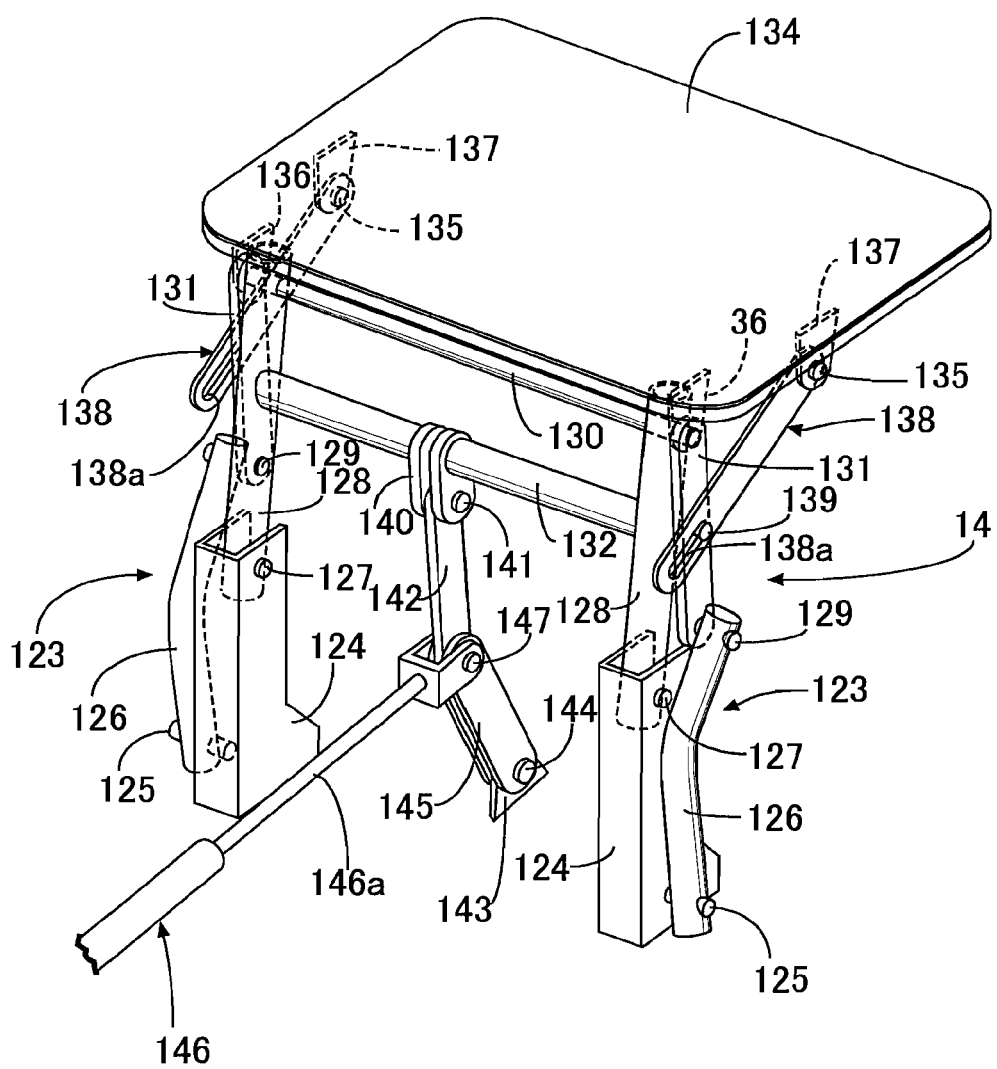
Figure 19:
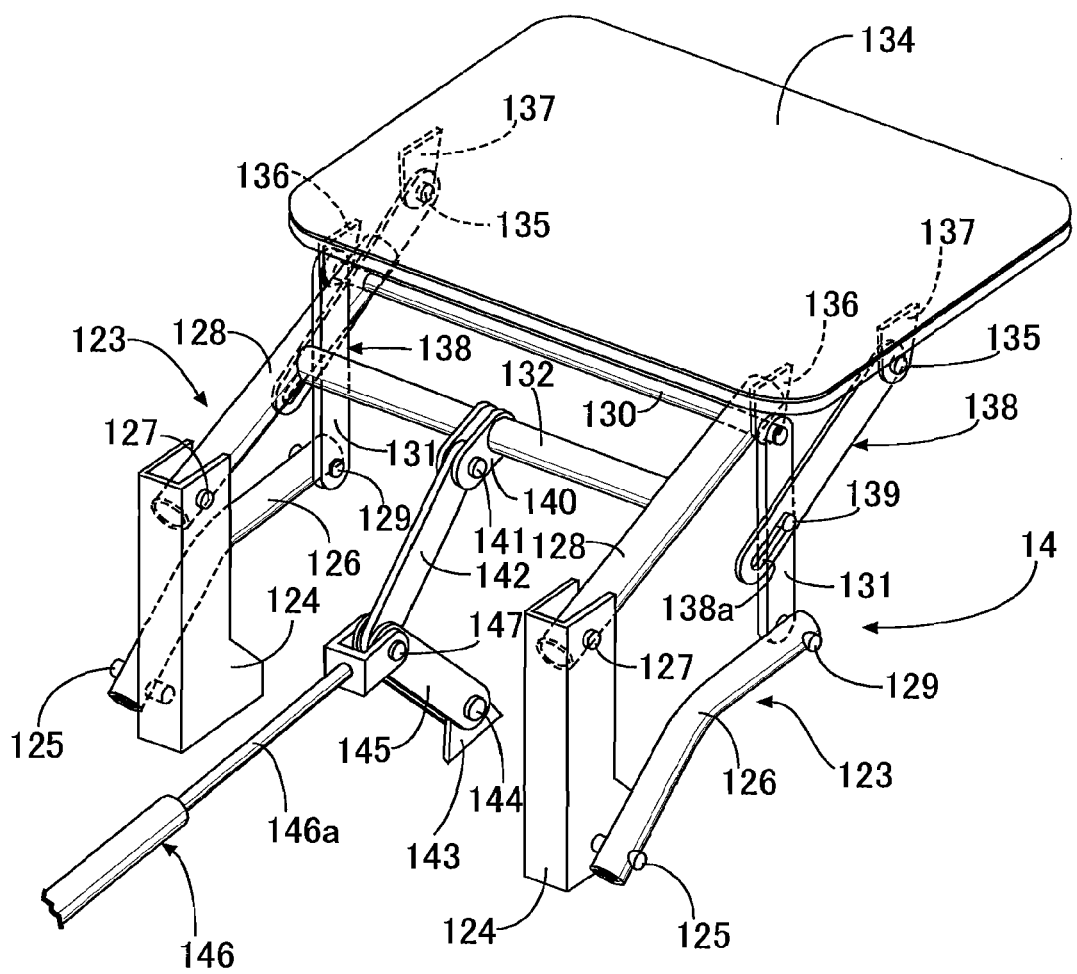
Figure 20:
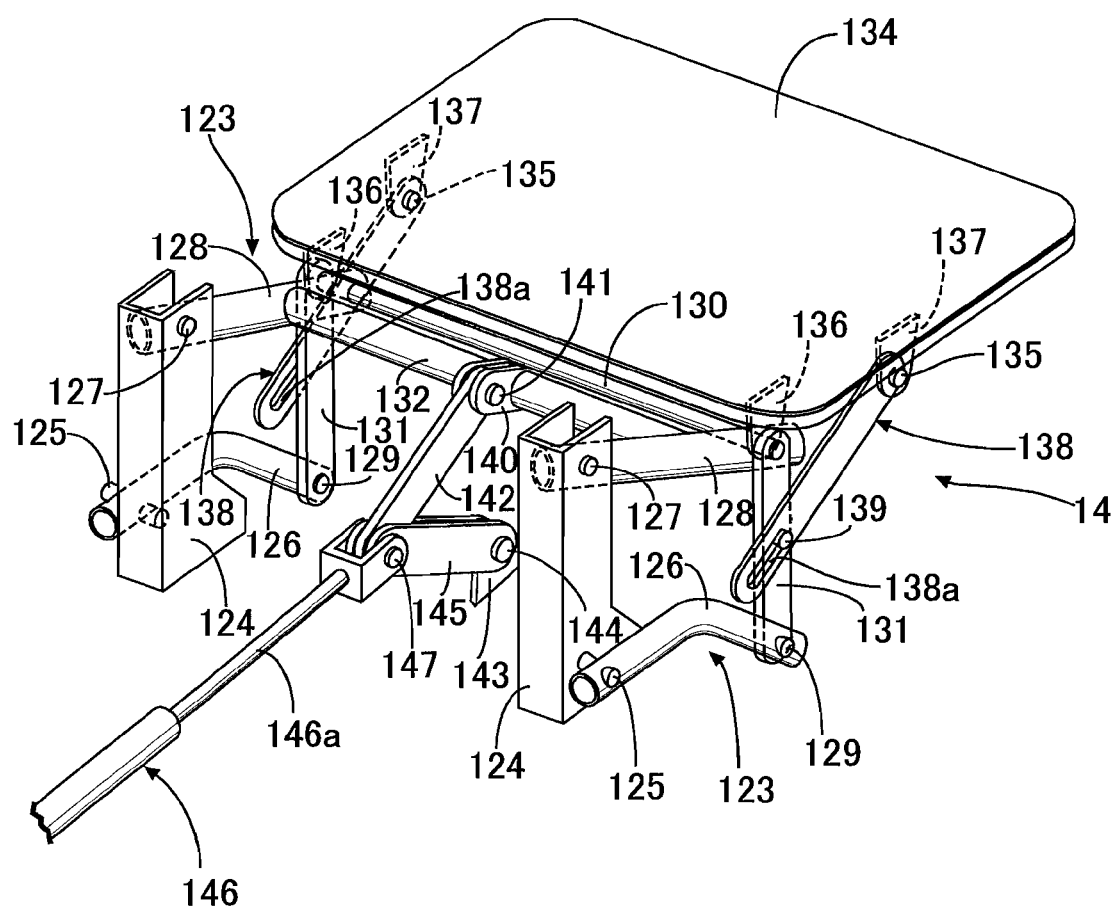

As shown in FIGS. 13, 14, and 18, the occupant transfer apparatus 14 includes a pair of front and rear four-link mechanisms 123, 123 supported on a floor panel 121 of a vehicle body through brackets 122, 122. The front four-link mechanism 123 and the rear four-link mechanism 123 have substantially the same structure. Each four-link mechanism 123 is formed of: a first longitudinal link 124 standing upright and having a lower end fixed to the bracket 122; a first lateral link 126 having an inner end in the vehicle width direction pivotally supported on a lower portion of the first longitudinal link 124 through a pin 125; a second lateral link 128 having an inner end in the vehicle width direction pivotally supported on an upper portion of the first longitudinal link 124 through a pin 127; and a second longitudinal link 131 having lower and upper ends pivotally supported on outer ends, in the vehicle width direction, of the first longitudinal link 126 and the second lateral link 128 through pins 129, 130, respectively. The pin 130 is long and shared by the pair of four-link mechanisms 123, 123. Middle portions of the two second lateral links 128, 128 of the pair of four-link mechanisms 123 are integrally coupled by a coupling member 132 extending in the front-rear direction.

Each four-link mechanism 123 is such that when the first lateral link 126 and the second lateral link 128 swing in the up-down direction about the pins 125, 127 provided between the first longitudinal link 124 and the first and second lateral links 126, 128, the second longitudinal link 131 rises or lowers in such a way as to draw an arc shape while maintaining a perpendicular posture in which the second longitudinal link 131 is parallel to the first longitudinal link 124. At a lowered position at which the first lateral link 126 and the second lateral link 128 are leaned, the second longitudinal link 131 is in its lowest position and in its outermost position in the vehicle width direction. In contrast, at a raised position at which the first lateral link 126 and the second lateral link 128 stand upright, the second longitudinal link 131 is in its highest position and in its innermost position in the vehicle width direction.

A pair of front and rear brackets 136, 136 protruding from a lower surface of an inner end, in the vehicle width direction, of a transfer board 134 are turnably supported on the aforementioned long pin 130. Moreover, ends of guide links 138, 138 on one side are pivotally supported on a pair of front and rear brackets 137, 137 protruding from a lower surface of an intermediate portion, in the vehicle width direction, of the transfer board 134 through pins 135, 135. Elongated holes 138*a*, 138*a* formed in ends of the guide links 138, 138 on the other side are slidably engaged with pins 139, 139 provided on intermediate portions of the second longitudinal links 131, 131. Thus, by swinging the transfer board 134 about the pin 130, one can select one of a use state in which the transfer board 134 projects laterally and a stored state in which the transfer board 134 stands in the up-down direction. When an assisted person sits on the transfer board 134, the pins 139, 139 come into contact with end portions of the elongated holes 138*a*, 138*a*, so that his or her weight is supported by the four-link mechanisms 123, 123.

An outer end, in the vehicle width direction, of a first drive link 142 is pivotally supported on a bracket 140 provided on an intermediate portion, in the front-rear direction, of the coupling member 132 through a pin 141. An outer end, in the vehicle width direction, of a second drive link 145 is pivotally supported on a bracket 143 provided on the floor panel 121 through a pin 144. A gas damper 146 is arranged along the vehicle width direction under the seat 122. Inner ends, in the vehicle width direction, of the first drive link 142 and the second drive link 145 are pivotally supported on a tip of a rod part 146*a* of the gas damper 146 through a common pin 147. The rod part 146*a* of the gas damper 146 is biased in such a way as to project outward in the vehicle width direction, and that load pushes up the coupling member 132 through the first drive link 142 and the second drive link 145, thereby biasing the four-link mechanisms 123, 123 to a standing direction.

Note that when the occupant transfer apparatus 14 is at the lowered position and at the raised position, an unillustrated lock mechanism prevents deformation of the four-link mechanisms 123, 123, thereby making it possible to lock the transfer board 134 such that it cannot be raised or lowered.

Next, operations of the second embodiment of the present invention having the above configuration will be described.

Figure 15:
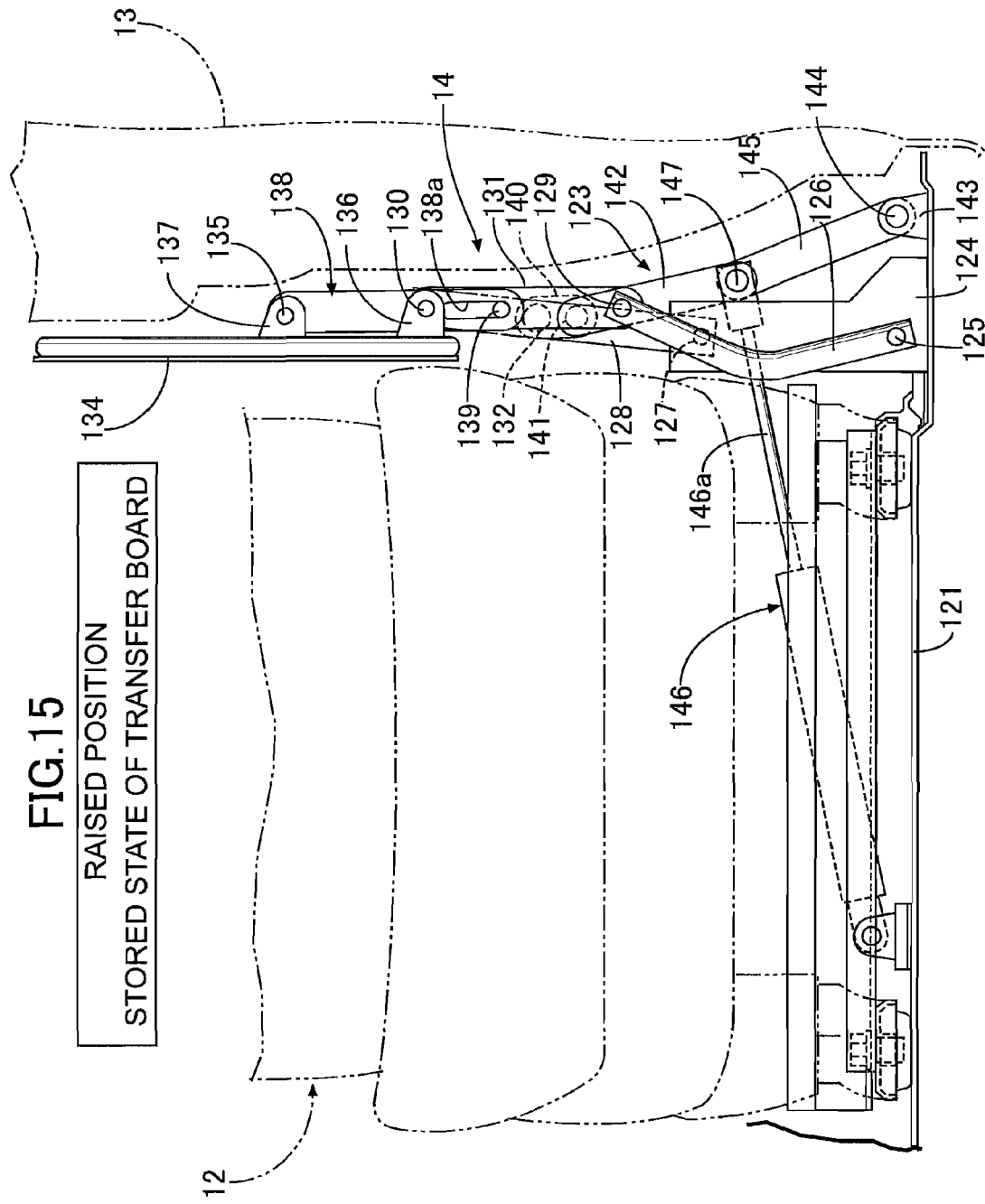
Figure 16:
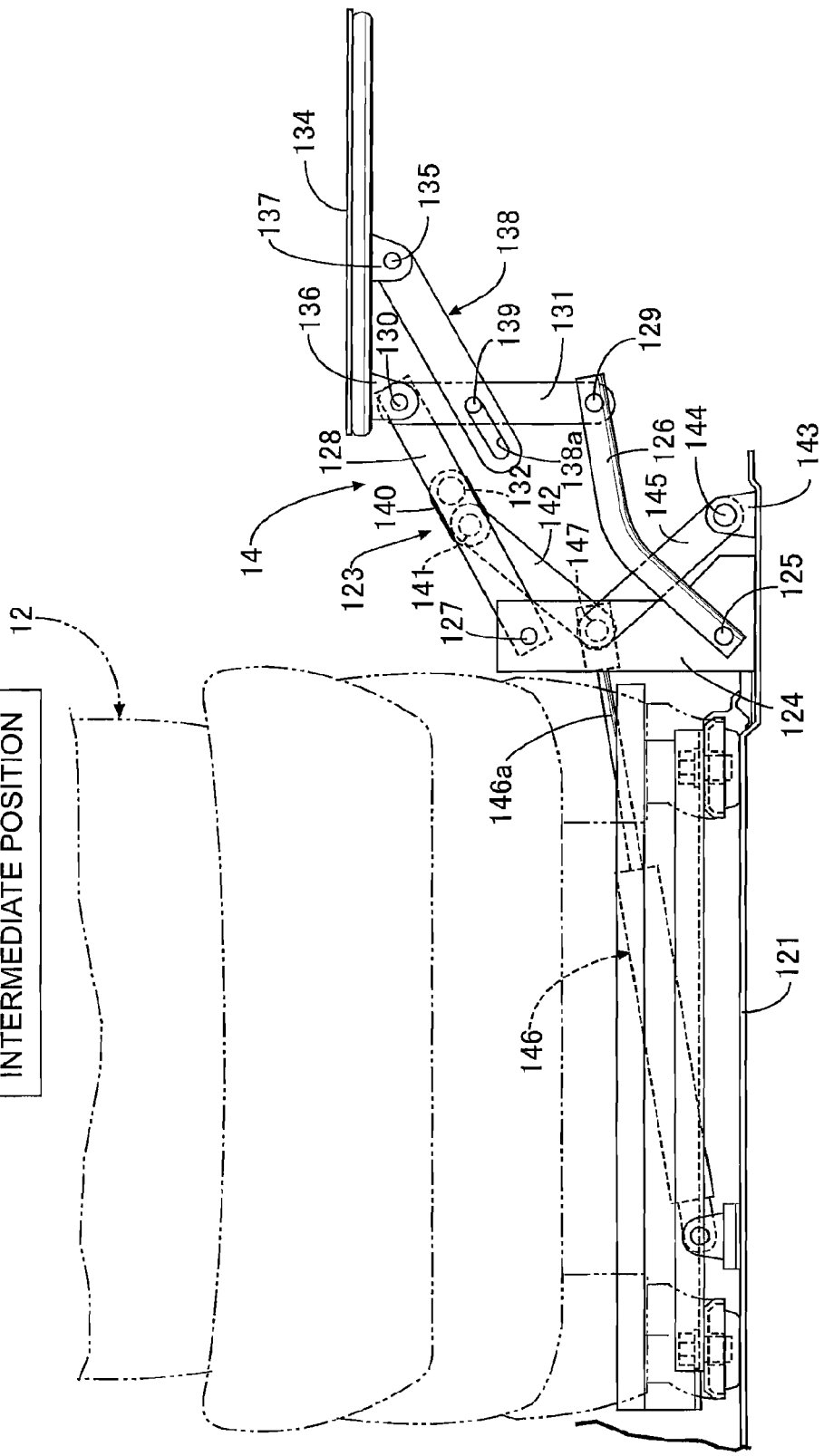
Figure 17:
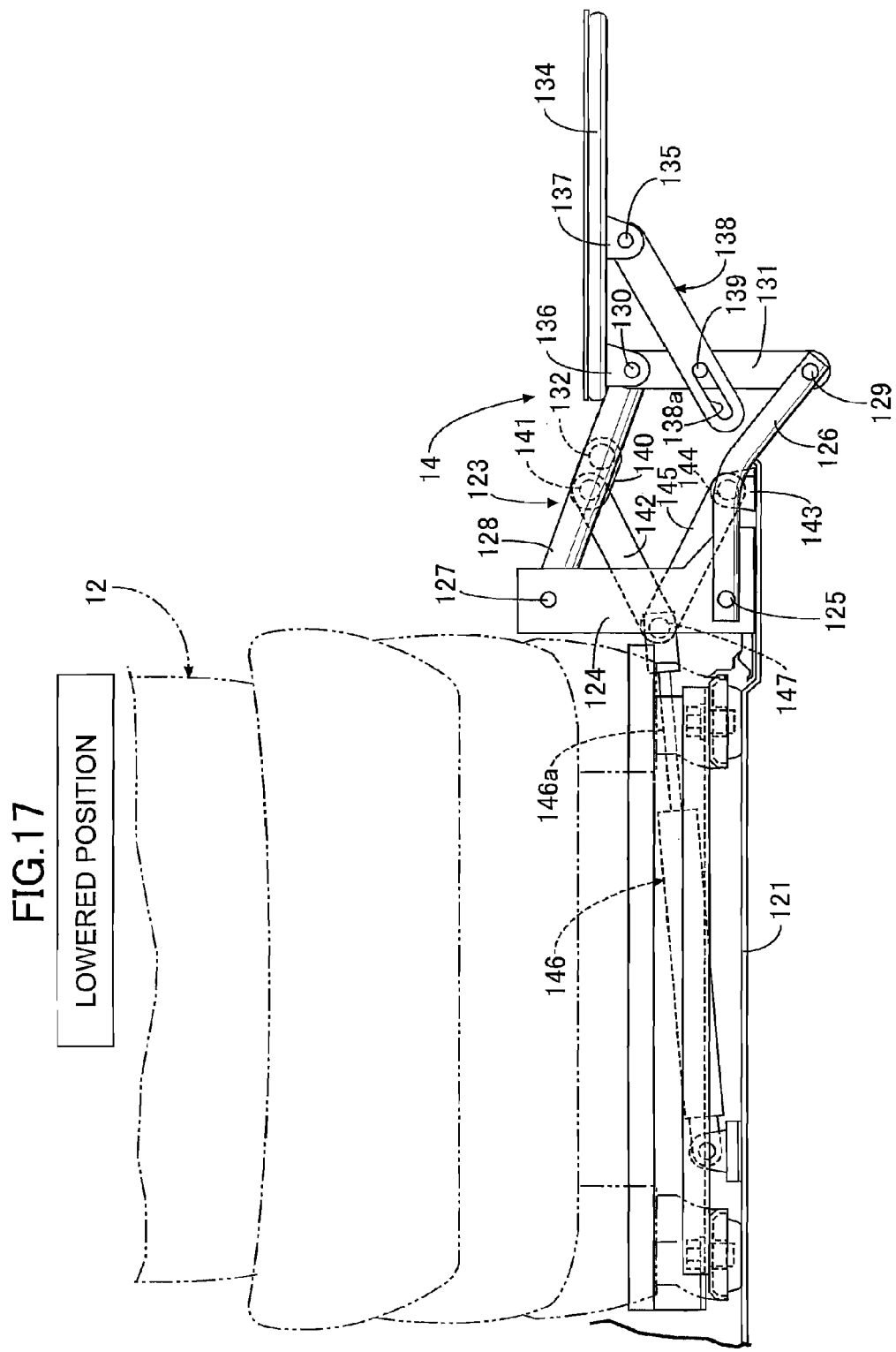

To transfer an assisted person on a wheelchair onto the seat 12 of the vehicle 11, a caregiver first opens the door 13 from a state of FIG. 15, and leans the transfer board 134, provided to the occupant transfer apparatus 14 locked at the raised position, from the stored position at which the transfer board 134 stands upright to the use position at which the transfer board 134 projects laterally outward in the vehicle width direction (see FIG. 14). Subsequently, the caregiver unlocks the occupant transfer apparatus 14 and pushes down the transfer board 134. As a result, the four-link mechanisms 123, 123 deform while compressing the gas damper 146, so that the transfer board 134 lowers while moving outward in the vehicle width direction. Then, when the transfer board 134 passes an intermediate position shown in FIGS. 16 and 19 and reaches the lowered position shown in FIGS. 17 and 20, the caregiver locks the occupant transfer apparatus 14 at the lowered position.

Figure 21A:
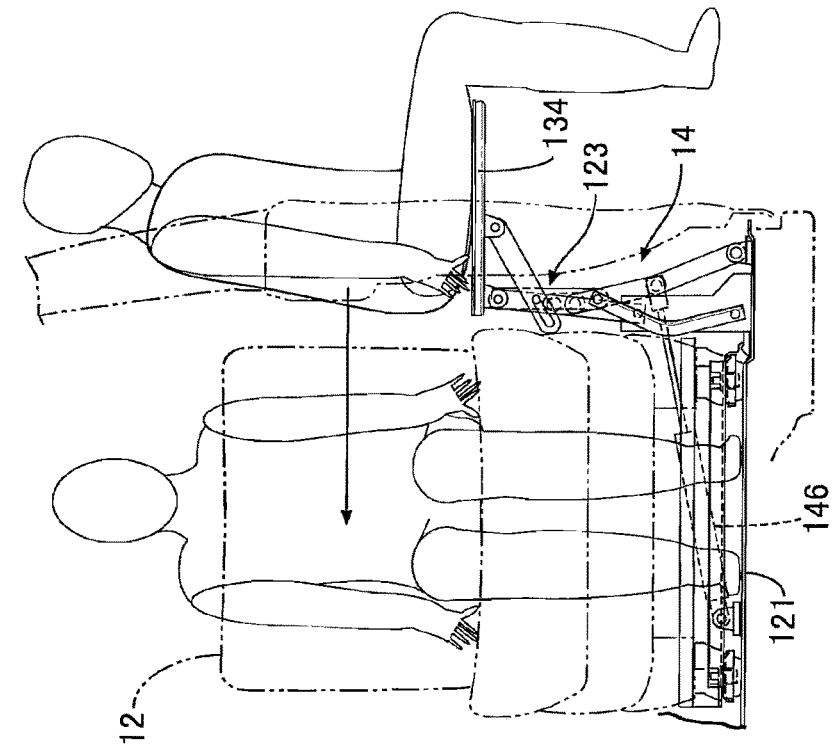
Figure 21B:
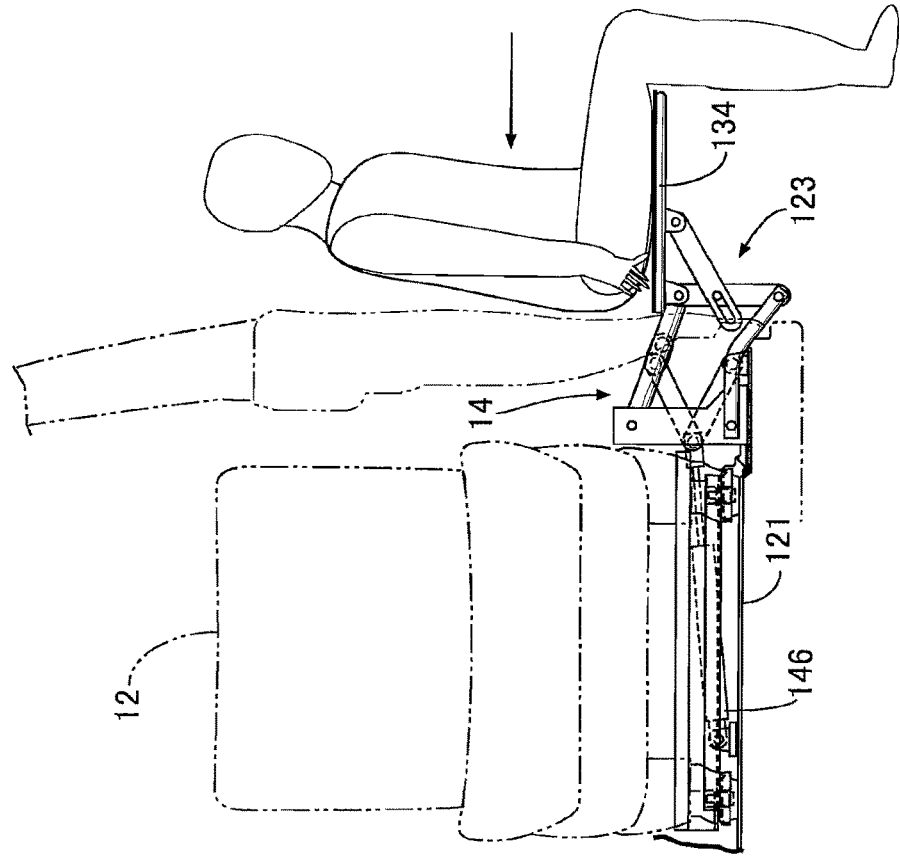

Subsequently, once moving the assisted person on the wheelchair onto the transfer board 134 as shown in FIG. 21A, the caregiver unlocks the occupant transfer apparatus 14. Here, the elastic force of the gas damper 146 is set slightly smaller than the weight of the assisted person. Hence, with deformation of the four-link mechanisms 123, 123, the transfer board 134 rises while moving inward in the vehicle width direction up to the intermediate position shown in FIGS. 16 and 19. From the intermediate position, the caregiver raises the transfer board 134 upward with small force. As a result, the transfer board 134 further rises while moving inward in the vehicle width direction. When the transfer board 134 reaches the raised position shown in FIGS. 14 and 18, the caregiver locks the occupant transfer apparatus 14 again. The assisted person can now move from this state into the vehicle-compartment off the transfer board 134 to be transferred onto the seat 12 as shown in FIG. 21B. Once the assisted person is transferred onto the seat 12 as described above, the caregiver folds the transfer board 134 upward from the use position to the stored position as shown in FIG. 15 so that the door 13 can be closed without interfering with the transfer board 134.

Transferring the assisted person from the seat 12 onto the wheelchair involves the opposite operations to those described above. The caregiver opens the door 13 and pulls down the transfer board 134 to the use position. Then, the caregiver moves the assisted person from the seat 12 onto the transfer board 134. Subsequently, as the caregiver unlocks the occupant transfer apparatus 14, the weight of the assisted person starts to compress the gas damper 146. As a result, with deformation of the four-link mechanisms 123, 123, the transfer board 134 lowers while moving outward in the vehicle width direction down to the intermediate position. The caregiver should just push the transfer board 134 further down to the lowered position, lock the occupant transfer apparatus 14, and transfer the assisted person from the transfer board 134 onto the wheelchair. Thereafter, the caregiver raises the transfer board 134 from the lowered position to the raised position and sets it to the standing posture so that the door 13 can be closed.

As described above, the elastic force of the gas damper 146 biases the four-link mechanisms 123, 123 upward. Thus, by balancing the elastic force of the gas damper 146 with the weight of the assisted person, the assisted person can be raised and lowered with very small force. Moreover, because there is no need for a special drive source such as an electric motor, the structure can be realized at low cost and also be made compact. This prevents the structure from narrowing the vehicle-compartment space and obstructing an able-bodied person getting in and out of the vehicle.

In addition, the transfer board 134 is supported in such a way as to be raisable and lowerable through the four-link mechanisms 123, 123. Thus, as the transfer board 134 lowers, the transfer board 134 gets away diagonally from a lateral side of the vehicle body, thereby making transfer from and onto the wheelchair easy. As the transfer board 134 rises, the transfer board 134 approaches diagonally to the lateral side of the vehicle body, thereby making transfer from and onto the seat 12 easy.

Moreover, the gas damper 146 biases the transfer board 134 upward by pushing the coupling member 132 coupling the second lateral links 128, 128 of the pair of four-link mechanisms 123, 123. Thus, the biasing force of the gas damper 146 can be distributed evenly to the pair of four-link mechanisms 123, 123. Accordingly, the transfer board 134 can be raised and lowered in a stable posture.

Moreover, the gas damper 146 is arranged under the seat 12. This can prevent the gas damper 146 from obstructing the transfer of an assisted person and prevent the gas damper 146 from narrowing the vehicle-compartment space.

Moreover, the door 13 facing the occupant transfer apparatus 14 is a slide door. Thus, it is possible to easily secure a space to arrange the occupant transfer apparatus 14 between the door 13 and the seat 12, and, in addition, to secure a wide door opening which makes it even easier for an assisted person to get in and out of the vehicle.

Although embodiments of the present invention have been described above, various design changes can be made to the present invention without departing from the gist thereof.

For example, the elastic member of the present invention is not limited to the gas damper 26 in the first embodiment and the gas damper 146 in the second embodiment, and may be a spring damper including a coil spring housed inside a tube, or the like.

Moreover, although the position of the upper joint 42 of the gas damper 26 is movable in the first embodiment, the position of the lower joint 43 may be movable.

Moreover, although the occupant transfer apparatus 14 is provided to the seat 12 on the right side of the vehicle body in the first embodiment, it may be provided to the seat on the left side of the vehicle body.

Moreover, although the occupant transfer apparatus 14 is provided to the seat 12 on the left side of the vehicle body in the second embodiment, it may be provided to the seat on the right side of the vehicle body.

Moreover, although two four-link mechanisms 123, 123 are used in the second embodiment, the number of four-link mechanisms may be any number as long as it is plural.

Moreover, although the coupling member 132 couples the pair of second lateral links 128, 128 in the second embodiment, the coupling member 132 may couple other suitable members of the pair of four-link mechanisms 123, 123.

What is claimed is:

1. An occupant transfer apparatus for a vehicle, comprising:
- a guide rail arranged substantially along an up-down direction between a seat and a door, the door being located sideward of the seat,
- a slide unit which is raisable and lowerable along the guide rail,
- a transfer board on which an occupant sits during transfer of the occupant, the transfer board being foldably supported by the slide unit; and
- an elongated elastic member for generating elastic force can be adjusted to be slightly smaller than a weight of the occupant, the elongated elastic member capable of being compressed by lowering of the transfer board due to the weight of the occupant, so that the transfer board supports part of the weight of the occupant by the elastic force of the elongated elastic member that has been compressed by the weight of the occupant, wherein
- the slide unit has a sidewall portion and a slider is provided at the sidewall portion,
- the slider is slidably engaged with the guide rail,
- the elongated elastic member connects a floor panel and the slide unit,
- an upper end portion and a lower end portion of the elongated elastic member are fixed to the slide unit and the floor panel, respectively,
- the transfer board is movable between an upper, raised position and a lowered position, and a lock mechanism is provided for locking the transfer board at the lowered position when the occupant is getting in the vehicle, and locking the transfer board at the raised position when the occupant is getting out of the vehicle, and
- wherein an attachment angle of the elongated elastic member with respect to the floor panel is adjustable by changing a position of at least one of a fixing part fixing the upper end portion to the slide unit and a fixing part fixing the lower end portion to the floor panel, thereby making adjustable the elastic force of the elongated elastic member, that supports part of the weight of the occupant, in response to the weight of the occupant.

2. The occupant transfer apparatus for a vehicle according to claim 1, wherein the upper end portion of the elongated elastic member is offset from the lower end portion thereof toward an outer side in a vehicle width direction.

3. The occupant transfer apparatus for a vehicle according to claim 1, wherein an assist elastic member which biases the slide unit upward is arranged between the floor panel and the slide unit.

4. The occupant transfer apparatus for a vehicle according to claim 1, wherein the door is a slide door.

5. The occupant transfer apparatus for a vehicle according to claim 4, wherein a vehicle-compartment-side surface of a door lining of the door is substantially flat.

* * * * *